(12) United States Patent
Kato

(10) Patent No.: US 12,525,118 B2
(45) Date of Patent: Jan. 13, 2026

(54) VEHICLE LEAVING COPING SYSTEM

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 73 days.

(21) Appl. No.: 18/533,977

(22) Filed: Dec. 8, 2023

(65) Prior Publication Data

US 2024/0203230 A1 Jun. 20, 2024

(30) Foreign Application Priority Data

Dec. 17, 2022 (JP) .................. 2022-201669

(51) Int. Cl.
| | |
|---|---|
| G06V 20/59 | (2022.01) |
| G06V 20/56 | (2022.01) |
| G06V 40/10 | (2022.01) |
| G07C 5/00 | (2006.01) |
| G08B 25/00 | (2006.01) |

(52) U.S. Cl.
CPC .......... G08B 25/001 (2013.01); G07C 5/008 (2013.01); *G06V 20/56* (2022.01); *G06V 20/59* (2022.01); *G06V 40/10* (2022.01)

(58) Field of Classification Search
None
See application file for complete search history.

(56) References Cited

U.S. PATENT DOCUMENTS

| | | | |
|---|---|---|---|
| 2005/0024188 A1 | 2/2005 | Sider | |
| 2018/0050575 A1* | 2/2018 | Campbell | ........... G01S 7/52006 |
| 2019/0193677 A1 | 6/2019 | Suzuki et al. | |
| 2022/0198909 A1 | 6/2022 | Inoue et al. | |
| 2023/0192035 A1* | 6/2023 | Herbert | .................. G08B 21/22 |
| | | | 340/457 |

FOREIGN PATENT DOCUMENTS

| | | |
|---|---|---|
| JP | 2010-128920 A | 6/2010 |
| JP | 2017-218032 A | 12/2017 |
| JP | 2020-086855 A | 6/2020 |

OTHER PUBLICATIONS

Extended European Search Report issued in the corresponding European patent Application No. 23215274.4 dated May 8, 2024.

* cited by examiner

*Primary Examiner* — John F Mortell
(74) *Attorney, Agent, or Firm* — Rimon P.C.

(57) ABSTRACT

A vehicle leaving coping system configured to cope with leaving of an occupant left in a parked or stopped vehicle includes the vehicle. The vehicle includes a first sensor, a main controller, an outside output device, and an output detection device. A main CPU in the main controller determines whether the occupant is to be rescued, based on a detection by the first sensor. When the occupant is to be rescued, the main CPU causes a rescue request sound to be outputted. When the third party is detected in the region around the vehicle after outputting of the rescue request sound, the main CPU causes a rescue guidance sound to be outputted. After the rescue request sound is outputted and outputting of the rescue guidance sound is started, the main CPU executes a process to unlock a locking apparatus to allow the third party to rescue the occupant.

14 Claims, 10 Drawing Sheets

VEHICLE LEAVING COPING SYSTEM

CROSS-REFERENCE TO RELATED APPLICATIONS

The present application claims priority from Japanese Patent Application No. 2022-201669 filed on Dec. 17, 2022, the entire contents of which are hereby incorporated by reference.

BACKGROUND

The disclosure relates to a vehicle leaving coping system.

A vehicle such as an automobile allows an occupant other than a driver to be present therein.

Therefore, a possibility that an occupant is left in a parked or stopped vehicle is not zero.

In such a situation where the occupant is left in the vehicle, an administrator of the vehicle may not be present near the vehicle. Non-limiting examples of the administrator of the vehicle may include a driver of the vehicle.

In this case, it is difficult for a person such as the administrator to rescue the occupant left in the vehicle.

SUMMARY

An aspect of the disclosure provides a vehicle leaving coping system configured to cope with leaving of an occupant left in a vehicle that is parked or stopped. The vehicle leaving coping system includes the vehicle. The vehicle includes a first sensor, a main controller, an outside output device, and an output detection device. The first sensor is configured to perform a detection of the occupant left in the vehicle. The vehicle is locked by a locking apparatus for the vehicle. The main controller includes a main central processing unit configured to execute a rescue control to rescue the occupant left in the vehicle. The outside output device is configured to output a sound from the vehicle toward an outside of the vehicle. The output detection device is configured to perform a detection of a third party in a region around the vehicle. The main central processing unit is configured to determine whether the occupant left in the vehicle is to be rescued, based on the detection performed by the first sensor. The main central processing unit is configured to, when the occupant left in the vehicle is to be rescued, cause, in the rescue control, a rescue request sound to be outputted from the outside output device toward the outside of the vehicle. The main central processing unit is configured to, when the third party is detected by the outside detection device in the region around the vehicle after outputting of the rescue request sound from the outside output device is started, cause a rescue guidance sound to be outputted from the outside output device toward the outside of the vehicle. The main central processing unit is configured to, after the rescue request sound is outputted and outputting of the rescue guidance sound is started, execute a process to unlock the locking apparatus to allow the third party in the region around the vehicle to rescue the occupant left in the vehicle.

An aspect of the disclosure provides a vehicle leaving coping system configured to cope with leaving of an occupant left in a vehicle that is parked or stopped. The vehicle leaving coping system includes the vehicle. The vehicle includes a first sensor, a main controller, an outside output device, and an output detection device. The first sensor is configured to perform a detection of the occupant left in the vehicle. The vehicle is locked by a locking apparatus for the vehicle. The main controller includes circuitry configured to execute a rescue control to rescue the occupant left in the vehicle. The outside output device is configured to output a sound from the vehicle toward an outside of the vehicle. The output detection device is configured to perform a detection of a third party in a region around the vehicle. The circuitry is configured to determine whether the occupant left in the vehicle is to be rescued, based on the detection performed by the first sensor. The circuitry is configured to, when the occupant left in the vehicle is to be rescued, cause, in the rescue control, a rescue request sound to be outputted from the outside output device toward the outside of the vehicle. The circuitry is configured to, when the third party is detected by the outside detection device in the region around the vehicle after outputting of the rescue request sound from the outside output device is started, cause a rescue guidance sound to be outputted from the outside output device toward the outside of the vehicle. The circuitry is configured to, after the rescue request sound is outputted and outputting of the rescue guidance sound is started, execute a process to unlock the locking apparatus to allow the third party in the region around the vehicle to rescue the occupant left in the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
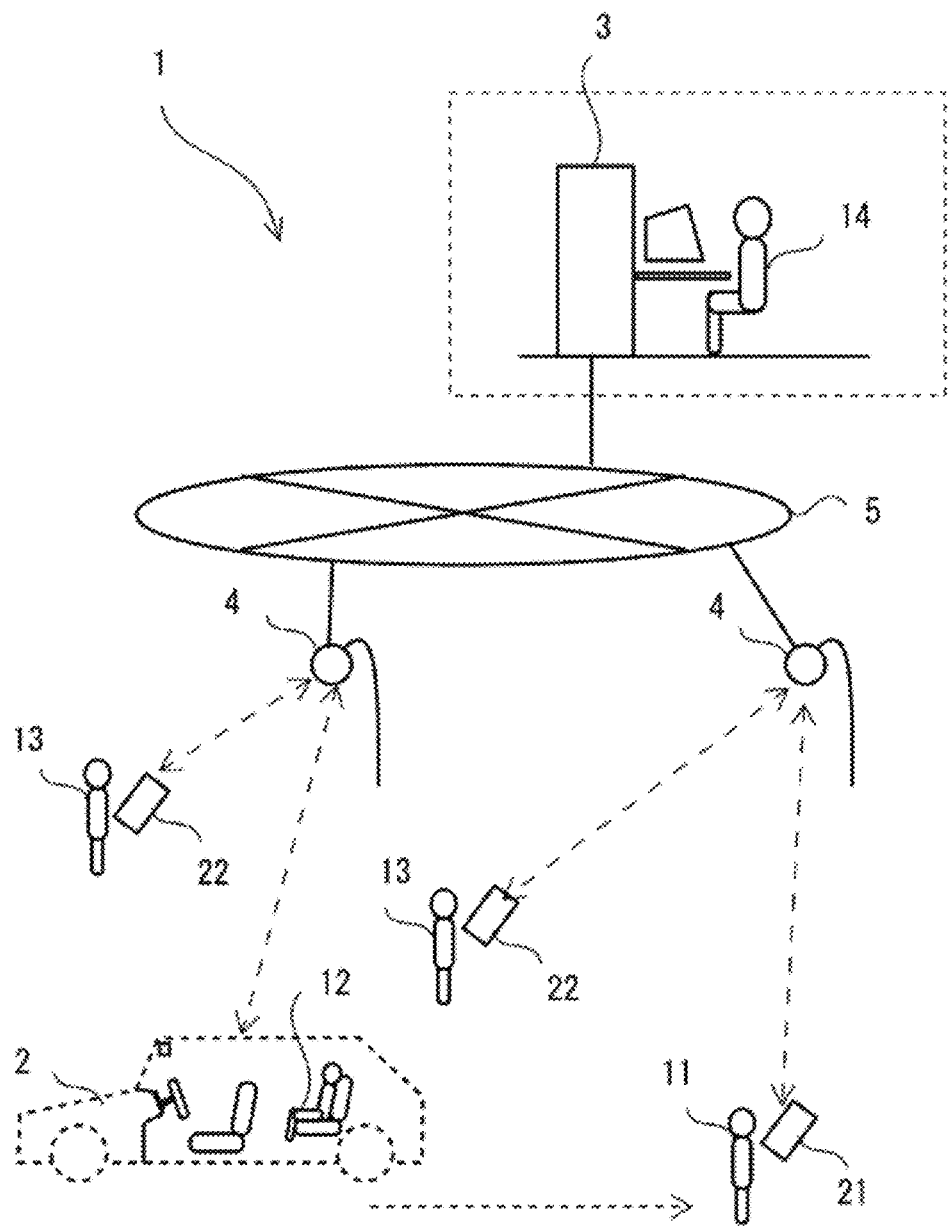
FIG. 1 is an explanatory diagram illustrating a vehicle leaving coping system according to one example embodiment of the disclosure.

Japanese Unexamined Patent Application Publication (JP-A) Nos. 2010-128920 and 2020-086855 each disclose a technique of, when detecting leaving of an occupant in a vehicle, unlocking the vehicle or outputting, for example, a warning screen toward a region around the vehicle.

However, although a warning is outputted toward the region around the vehicle as disclosed in JP-A Nos. 2010-128920 and 2020-086855, a driver to rescue may not be present in the region around the vehicle, or even a third party may not be present in the region around the vehicle. Moreover, a person in the region around the vehicle may not notice the warning screen.

Japanese Unexamined Patent Application Publication (JP-A) No. 2022-099183 discloses a technique of sending a request for a rescue, from a server apparatus to a terminal belonging to the driver or to a police station.

However, although the request for a rescue is sent to the driver or the police station as disclosed in JP-A No. 2022-099183, if the driver or the police station is far away from the vehicle, it is difficult to rescue the occupant at an early timing.

It is desirable to make it possible to perform an early rescue in relation to leaving of an occupant in a vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 is an explanatory diagram illustrating a vehicle leaving coping system 1 according to a first example embodiment of the disclosure.

The vehicle leaving coping system 1 illustrated in FIG. 1 may include a vehicle 2 and a server apparatus 3. Non-limiting examples of the vehicle 2 may include an automobile. The server apparatus 3 may be configured to communicate with the vehicle 2 via a communication network 5. The communication network 5 may be coupled to base stations 4.

FIG. 1 also illustrates a mobile terminal of a driver 11 and a mobile terminal of a third party 13 near the vehicle 2 in addition to the vehicle 2 as devices each configured to establish a wireless communication line between the device and any of the base stations 4. The driver 11 may be an administrator of the vehicle 2. Hereinafter, the mobile terminal of the driver 11 may be referred to as an administrator terminal 21. Hereinafter, the mobile terminal of the third party 13 near the vehicle 2 may be referred to as a third party terminal 22.

Figure 2:
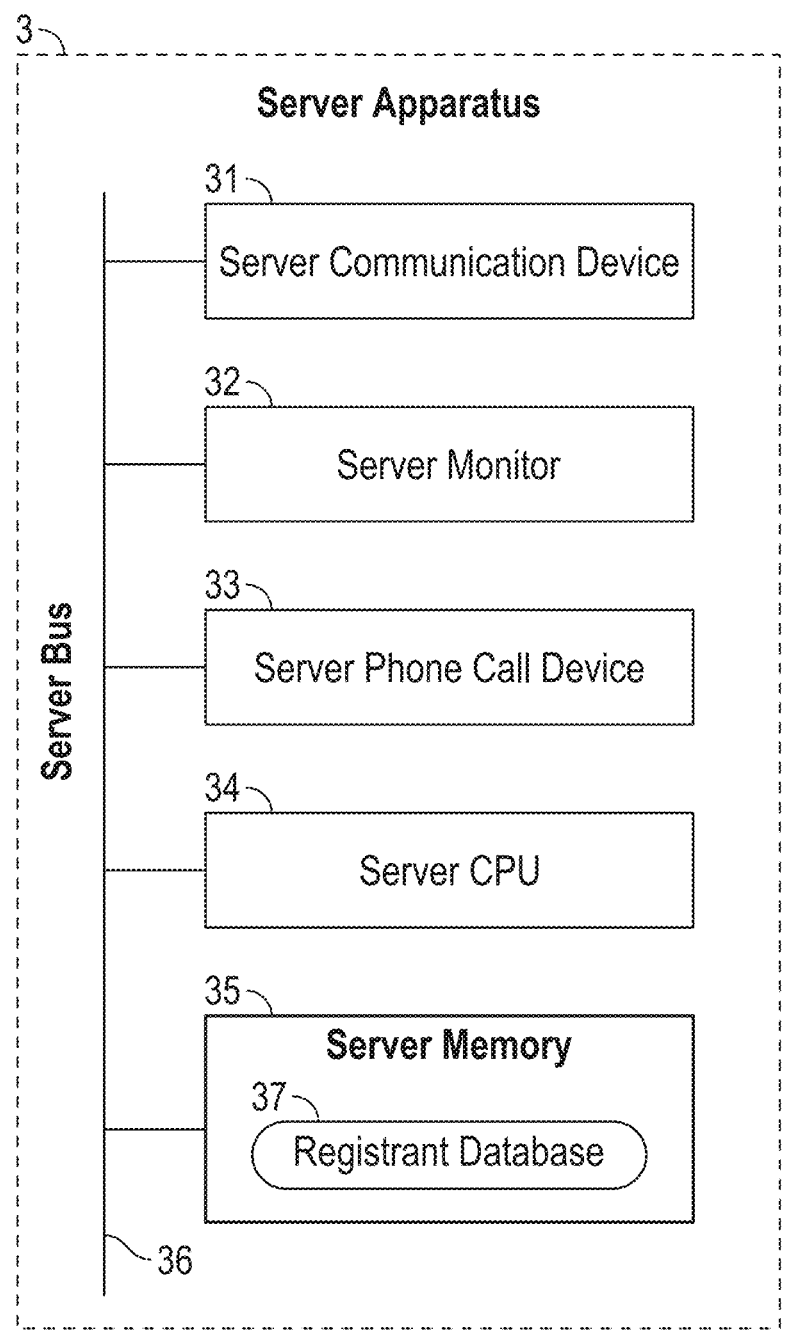
FIG. 2 is a configuration diagram of a server apparatus illustrated in FIG. 1.

FIG. 2 is a configuration diagram of the server apparatus 3 illustrated in FIG. 1.

The server apparatus 3 illustrated in FIG. 2 may include, for example, a server communication device 31, a server monitor 32, a server phone call device 33, a server central processing unit (CPU) 34, a server memory 35, and a server bus 36. The server communication device 31, the server monitor 32, the server phone call device 33, the server CPU 34, and the server memory 35 may be coupled to the server bus 36.

The server communication device 31 may be coupled to the communication network 5 illustrated in FIG. 1. The server communication device 31 may be configured to communicate with any of the vehicles and the devices having established a wireless communication line with the base station 4, such as the vehicle 2, the administrator terminal 21, or the third party terminal 22.

The server monitor 32 may display various screens toward a person such as an operator 14 of a service organization in which the server apparatus 3 is provided. The various screens may include, for example but not limited to, a screen for coping with leaving of an occupant.

The server phone call device 33 may be used by the operator 14 to make a phone call and talk with a person. Non-limiting examples of the person may include the driver and the occupant of the vehicle 2 with which the server communication device 31 is communicable. The server phone call device 33 may include, for example, a speaker and a microphone.

The server memory 35 may include, for example, a hard disk drive (HDD), a solid state drive (SSD), and any other device. The server memory 35 may hold information including, without limitation, a program to be executed by the server CPU 34 and log data related to leaving of an occupant. The server memory 35 illustrated in FIG. 2 may include, for example, a registrant database (DB) 37. The registrant database 37 may hold information regarding registrants that may be able to cope with leaving of an occupant. Non-limiting examples of the information to be recorded in the registrant database 37 may include information regarding a mobile terminal of a registrant and position information related to the mobile terminal of the registrant. The position information may be updated on a real-time basis in accordance with a movement of the mobile terminal.

The server CPU 34 may execute the program recorded in the server memory 35. This may implement a server controller in the server apparatus 3. The server controller may execute controls related to operations of the server apparatus 3 and various services offered by the server apparatus 3.

The vehicle leaving coping system 1 illustrated in FIG. 1 may be configured to allow the vehicle 2 and the server apparatus 3 to cooperate with each other and cope with leaving of an occupant in the vehicle 2.

In FIG. 1, a child 12 may be left in a rear seat of the vehicle 2 from which the driver 11 who is the administrator has got off and gone away.

In such a situation, for example, the vehicle 2 may detect leaving of the child 12, and the server apparatus 3 may notify the administrator terminal 21 of the leaving of the child 12 based on the detection by the vehicle 2.

However, the driver 11 who has gotten off the vehicle 2 has already moved far away from the vehicle 2. Therefore, although the driver 11 attempts to go back to the vehicle 2 and cope with the leaving of the child 12, it can take time to finally rescue the child 12.

In an alternative example different from the example illustrated in FIG. 1, the server apparatus 3 may notify, for example, a police station of the leaving of the child 12. In this case also, it can take time for a police officer to arrive at the vehicle 2.

As described above, it may be desired to allow for a rescue at a timing as early as possible in relation to the leaving of the occupant such as the child 12.

Figure 3:
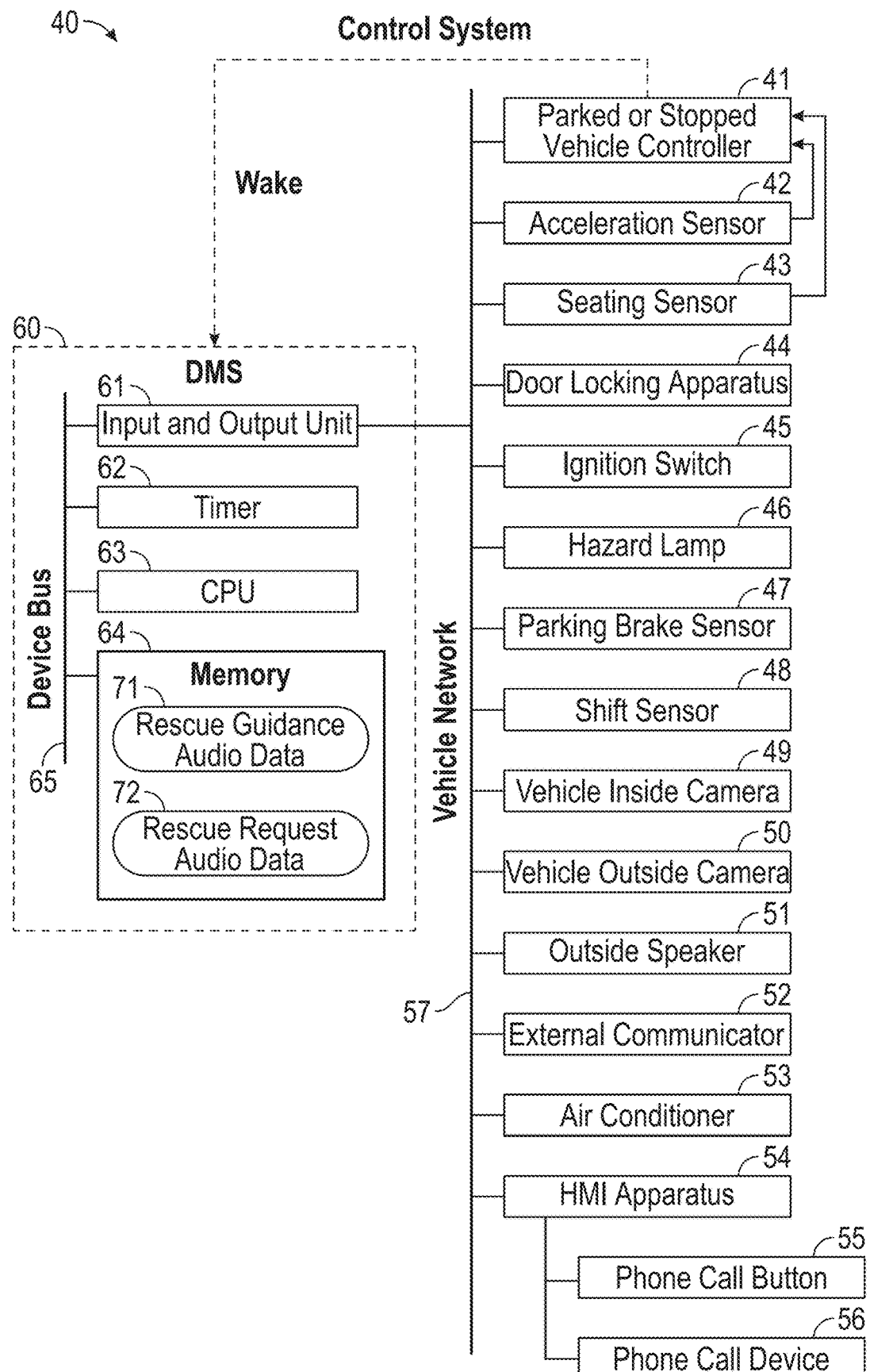
FIG. 3 is a configuration diagram of a control system serving as an occupant leaving coping apparatus in a vehicle illustrated in FIG. 1.

FIG. 3 is a configuration diagram of a control system 40 serving as an occupant leaving coping apparatus in the vehicle 2 illustrated in FIG. 1.

The control system 40 illustrated in FIG. 3 may include, for example, a driver monitoring system (DMS) 60, a parked or stopped vehicle controller 41, and a vehicle network 57. The DMS 60 and the parked or stopped vehicle controller 41 may be coupled to the vehicle network 57. In addition, coupled to the vehicle network 57 may be an acceleration sensor 42, a seating sensor 43, a door locking apparatus 44, an ignition switch 45, a hazard lamp 46, a parking brake sensor 47, a shift sensor 48, a vehicle inside camera 49, a vehicle outside camera 50, an outside speaker 51, an external communicator 52, an air conditioner 53, and a human machine interface (HMI) apparatus 54.

The vehicle network 57 may include, for example, a wired communication network compliant with, for example, a controller area network (CAN) or a local interconnect network (LIN) for the vehicle 2. For example, the vehicle network 57 may include a communication network such as a local area network (LAN), or may include a combination of any two or more of the above. For example, the vehicle network 57 may partially include a wireless communication network. The foregoing various devices and apparatuses coupled to the vehicle network 57 may perform mutual transmission and reception of information including, without limitation, detection data and control data via the vehicle network 57.

The acceleration sensor 42 may detect an acceleration that acts on the vehicle 2. The acceleration sensor 42 may detect an acceleration in orthogonal triaxial directions. In this case, an angular acceleration or an angular velocity in each of a pitch direction, a yaw direction, and a roll direction of the vehicle 2 may be calculated based on detection information obtained by the acceleration sensor 42. In addition, a speed of the vehicle 2 may be calculated by integrating the acceleration of the vehicle 2. The acceleration sensor 42 may be configured to detect, for example, a vibration of a vehicle body of the vehicle 2 also when the vehicle 2 is parked or stopped. For example, when an occupant is left in the vehicle 2, the acceleration sensor 42 may be able to detect a vibration caused by a movement of the occupant.

The seating sensor 43 may be provided at a part such as a seat surface of a seat provided in the vehicle 2. The seating sensor 43 may be configured to output a detection value corresponding to a weight of an occupant seated on the seat. When no occupant is seated on the seat, the seating sensor 43 may output a detection value indicating absence of an occupant.

The door locking apparatus 44 may be a locking apparatus that locks or unlocks a door or doors of the vehicle 2. For example, the door locking apparatus 44 may lock and unlock all of the doors of the vehicle 2 together, or may lock and unlock an individual door of the vehicle 2.

The ignition switch 45 may be a switch to be operated when the driver causes the vehicle 2 to travel. When the ignition switch 45 is turned on, the vehicle 2 may become travelable. When the ignition switch 45 is turned off, the vehicle 2 may be non-travelable.

The hazard lamp 46 may be a lamp provided at a location such as an outer surface of each of four corners of the vehicle body of the vehicle 2, i.e., front-left, front-right, rear-left, and rear-right corners of the vehicle body of the vehicle 2. Typically, the vehicle 2 may further include lamps including, without limitation, a head lamp, a brake lamp, and an advanced driving assistant system (ADAS) lamp. A lighting state of the lamp such as the hazard lamp 46 may be visually recognizable from a place far away from the vehicle 2.

The parking brake sensor 47 may detect a position of a parking brake provided as a braking apparatus in the vehicle 2. The parking brake may be at a position before an operation is performed on the parking brake, while the vehicle 2 is traveling. For example, when the vehicle 2 is parked, the parking brake may be at a position after the operation is performed on the parking brake. The parking brake sensor 47 may detect such a position of the parking brake.

The shift sensor 48 may detect a position of a gear shift lever provided in the vehicle 2. The gear shift lever may be operated and positioned at a driving position when the vehicle 2 is to be caused to travel. For example, when the vehicle 2 is parked, the gear shift lever may be operated and positioned at a parking position. The shift sensor 48 may detect such a position of the gear shift lever.

The vehicle inside camera 49 may capture an image of an inside of the vehicle 2. When an occupant is present in the vehicle 2, the vehicle inside camera 49 may capture an image including the occupant. When no occupant is present in the vehicle 2, the vehicle inside camera 49 may capture an image including no occupant.

Note that the occupant in the vehicle 2 may be detected by a radar, a millimeter-wave sensor, an infrared-ray sensor, or any sensor other than the vehicle inside camera 49.

The vehicle outside camera 50 may capture an image of an outside of the vehicle 2. The vehicle outside camera 50 may include multiple cameras, or may include a 360-degree camera. When a person is present in a place such as a region around the vehicle 2, the vehicle outside camera 50 may capture an image including the person. When no person is present in a place such as the region around the vehicle 2, the vehicle outside camera 50 may capture an image including no person.

Note that the person present in a place such as the region around the vehicle 2 may be detected, for example, by a device such as a light detection and ranging (LiDAR) or a laser, other than the vehicle outside camera 50. In one embodiment, the vehicle outside camera 50, the LiDAR, or the laser described above may serve as an "outside detection device". The vehicle outside camera 50, the LiDAR, or the laser described above may be configured to detect a third party in the region around the vehicle 2.

The outside speaker 51 may be configured to output a sound toward an outside of the vehicle 2. In one embodiment, the outside speaker 51 may serve as an "outside output device". For example, the outside speaker 51 may be provided in an engine room of the vehicle 2 as with an existing horn, or may be provided in a vehicle compartment of the vehicle 2.

The external communicator 52 may establish a wireless communication line, for example, between the external communicator 52 and the base station 4 near the vehicle 2. The external communicator 52 may control transmission and reception of information between the external communicator 52 and an apparatus or a device such as the server apparatus 3.

In one example, the external communicator 52 may establish a wireless communication line between the external communicator 52 and, for example, a vehicle other than the vehicle 2.

The air conditioner 53 may control, for example, a temperature in the vehicle compartment of the vehicle 2.

The HMI apparatus 54 may be provided in the vehicle compartment of the vehicle 2. The HMI apparatus 54 may be an interface apparatus for an occupant in the vehicle 2. The HMI apparatus 54 may include, for example, a monitor, a touch panel, a speaker, a microphone, or any other device. In FIG. 3, a phone call button 55 and a phone call device 56 may be coupled to the HMI apparatus 54.

The parked or stopped vehicle controller 41 may be a controller that operates while the vehicle 2 is parked. For example, the parked or stopped vehicle controller 41 may operate with low power consumption to suppress battery consumption while the vehicle 2 is parked. In one example, when an occupant gets in the vehicle 2, the parked or stopped vehicle controller 41 may output an activation signal to an apparatus or a device such as the DMS 60. The DMS 60 that has been stopped while the vehicle 2 has been parked may start operating in response to the activation signal.

In FIG. 3, the acceleration sensor 42 and the seating sensor 43 may be coupled to the parked or stopped vehicle controller 41. This may allow, when the occupant in the parked vehicle 2 is seated on the seat or moves, the parked or stopped vehicle controller 41 to detect such a seated state or such a movement. In this case, the acceleration sensor 42 and the seating sensor 43 may detect the occupant left in the parked or stopped vehicle 2. In one embodiment, the acceleration sensor 42 and the seating sensor 43 may each serve as a "first sensor".

The DMS 60 may monitor the occupant present in the vehicle 2.

The DMS 60 illustrated in FIG. 3 may include an input and output unit 61, a timer 62, a CPU 63, a memory 64, and a device bus 65. The input and output unit 61, the timer 62, the CPU 63, and the memory 64 may be coupled to the device bus 65.

The input and output unit 61 may be coupled to the vehicle network 57. The input and output unit 61 may communicate, via the vehicle network 57, with another device or apparatus coupled to the vehicle network 57.

The timer 62 may measure, for example, a period of time or a time.

The memory 64 may include, for example, the HDD, the SDD, and any other device. The memory 64 may hold a program to be executed by the CPU 63 and various kinds of data. The memory 64 illustrated in FIG. 3 may hold rescue guidance audio data 71 and rescue request audio data 72.

The rescue guidance audio data 71 may include audio data to give a guidance regarding a rescue procedure to rescue an occupant left in the vehicle 2.

The rescue request audio data 72 may include audio data to draw attention, to the vehicle 2, of a person in the region around or near the vehicle 2. In one example, the rescue request audio data 72 may include audio data including a horn sound or a siren sound.

The CPU 63 may execute the program recorded in the memory 64. This may implement a controller in the DMS 60. The controller may execute controls to perform operations of the DMS 60 and various services using the DMS 60.

Now, a description is provided of various controls to rescue an occupant left in the vehicle 2. The various controls may use the control system 40 illustrated in FIG. 3.

Here, the description is provided based on the assumption that the DMS 60 in the control system 40 illustrated in FIG. 3 may execute a rescue control to rescue the occupant left in the vehicle 2. In one embodiment, the DMS 60 may serve as a "main controller". The description is provided also based on the assumption that the parked or stopped vehicle controller 41 may operate while the vehicle 2 is parked. In one embodiment, the parked or stopped vehicle controller 41 may serve as an "auxiliary controller". The parked or stopped vehicle controller 41 may be configured to operate with lower power consumption than the DMS 60.

In one example, the rescue control may be executed by another controller provided in the control system 40. The other controller to be used to execute the rescue control may be, for example, a controller having a relatively high performance CPU. Non-limiting examples of such a controller may include a central controller (C-ECU) used to manage a system of the vehicle 2, and a controller for a head unit such as the HMI apparatus 54.

Figure 4:
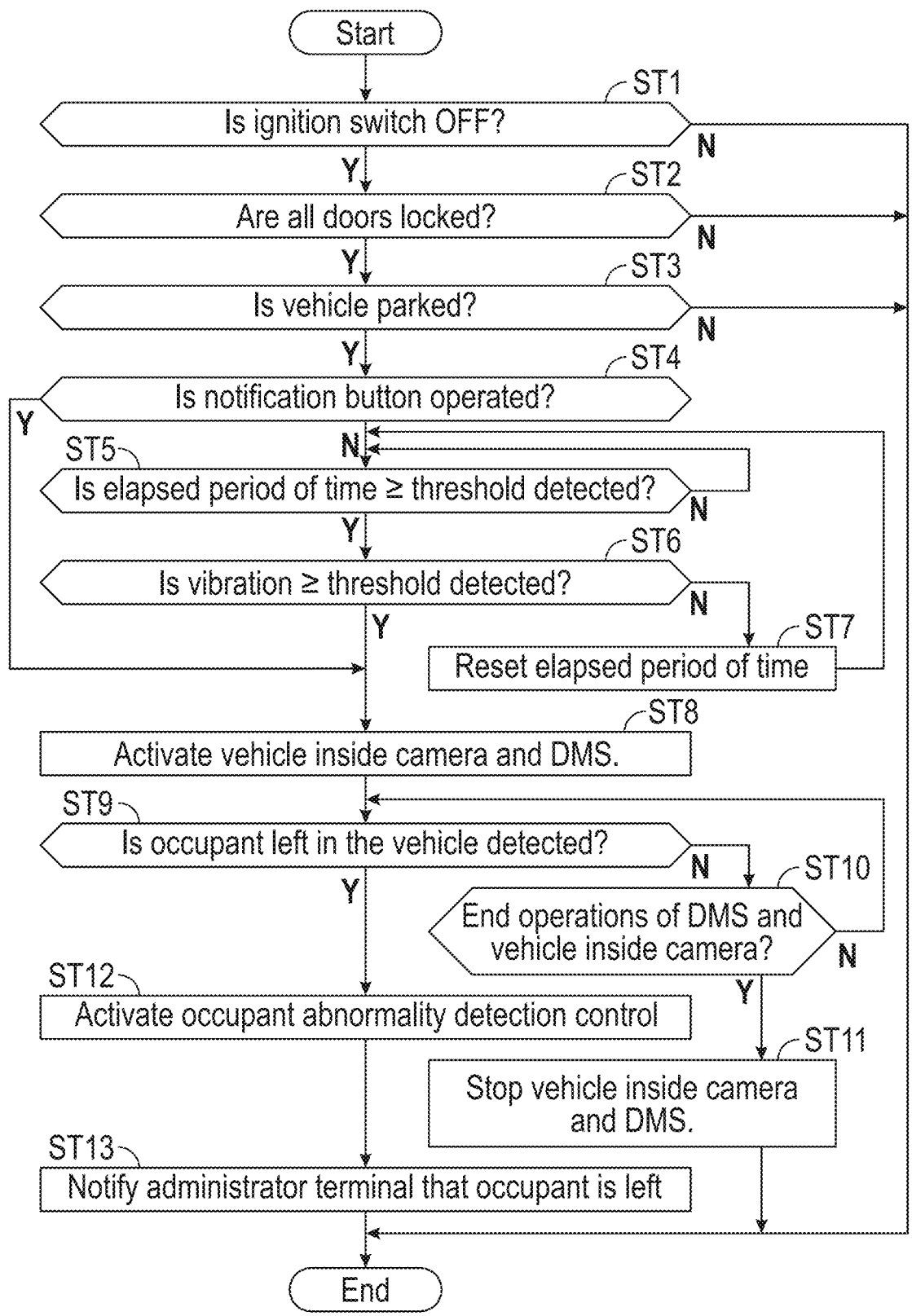
FIG. 4 is a flowchart of an activation control for coping with leaving (a first pre-process of a rescue control) to be executed by the control system of the vehicle illustrated in FIG. 3.

FIG. 4 is a flowchart of an activation control for coping with leaving (a first preprocess of the rescue control) to be executed by the control system 40 for the vehicle 2 illustrated in FIG. 3.

In the control system 40 for the vehicle 2 illustrated in FIG. 3, for example, the parked or stopped vehicle controller 41 and the DMS 60 may repeatedly execute the activation control for coping with leaving illustrated in FIG. 4, regardless of whether the vehicle 2 is traveling or is parked or stopped.

The parked or stopped vehicle controller 41 and the DMS 60 may execute the activation control for coping with leaving illustrated in FIG. 4 as a first pre-stage control of the rescue control.

In step ST1, the parked or stopped vehicle controller 41 may determine whether the ignition switch 45 is in an OFF state. If the ignition switch 45 is not in the OFF state (step ST1: N), the parked or stopped vehicle controller 41 may end this control. If the ignition switch 45 is in the OFF state (step ST1: Y), the parked or stopped vehicle controller 41 may cause the process to proceed to step ST2.

In step ST2, the parked or stopped vehicle controller 41 may determine whether all the doors of the vehicle 2 are locked by the door locking apparatus 44. If not all the doors of the vehicle 2 are locked (step ST2: N), the parked or stopped vehicle controller 41 may end this control. If all the doors of the vehicle 2 are locked (step ST2: Y), the parked or stopped vehicle controller 41 may cause the process to proceed to step ST3.

In step ST3, the parked or stopped vehicle controller 41 may determine whether the vehicle 2 is parked. If the ignition switch 45 is in the OFF state and all the doors of the vehicle 2 are locked, basically, the vehicle 2 may be parked. For example, the parked or stopped vehicle controller 41 may determine whether the vehicle 2 is parked based on other information. If the vehicle 2 is not parked (step ST3: N), the parked or stopped vehicle controller 41 may end this control. If the vehicle 2 is parked (step ST3: Y), the parked or stopped vehicle controller 41 may cause the process to proceed to step ST4.

In step ST4, the parked or stopped vehicle controller 41 may determine whether a notification button is operated. For example, when an occupant has an issue in the parked or stopped vehicle 2, the occupant may operate the notification button. If the notification button is operated (step ST4: Y), the parked or stopped vehicle controller 41 may cause the process to proceed to step ST8. If the notification button is not operated (step ST4: N), the parked or stopped vehicle controller 41 may cause the process to proceed to step ST5.

In step ST5, the parked or stopped vehicle controller 41 may determine whether an elapsed period of time is greater than or equal to a threshold. The elapsed period of time may be measured by the timer 62. The threshold based on which the determination regarding the elapsed period of time is performed may correspond to a cycle at which the parked or stopped vehicle controller 41 repeats a determination in step ST6. Increasing the threshold may help to suppress power consumption while the vehicle 2 is parked. If the elapsed period of time is not greater than or equal to the threshold (step ST5: N), the parked or stopped vehicle controller 41 may repeat this process. If the elapsed period of time becomes greater than or equal to the threshold (step ST5: Y), the parked or stopped vehicle controller 41 may cause the process to proceed to step ST6.

In step ST6, the parked or stopped vehicle controller 41 may determine whether the acceleration sensor 42 is detecting a vibration greater than or equal to a threshold. If the acceleration sensor 42 is not detecting the vibration greater than or equal to the threshold (step ST6: N), the parked or stopped vehicle controller 41 may cause the process to proceed to step ST7. If the acceleration sensor 42 is detecting the vibration greater than or equal to the threshold (step ST6: Y), the parked or stopped vehicle controller 41 may cause the process to proceed to step ST8.

Here, in one example, the threshold related to the detection of the vibration may be set to a level that allows the acceleration sensor 42 to detect a vibration caused by a movement of an occupant such as a baby or an infant in the vehicle 2. Thus, when the parked or stopped vehicle controller 41 detects the vibration indicating a possibility that an occupant is left in the vehicle 2 based on the detection performed by the acceleration sensor 42, the parked or stopped vehicle controller 41 may cause the process to proceed to step ST8. In one embodiment, the acceleration sensor 42 may serve as the "first sensor".

In one example, the threshold related to the detection of the vibration may be greater than a level that allows the acceleration sensor 42 to detect a vibration caused by, for example, a small earthquake or a vibration of a road surface. In addition, the threshold related to the detection of the vibration may be greater than a level that allows the acceleration sensor 42 to detect a vibration caused, for example, by strong wind. This may help to prevent an error when the parked or stopped vehicle controller 41 determines the possibility of leaving of an occupant.

In step ST7, the parked or stopped vehicle controller 41 may reset the elapsed period of time that has been measured by the timer 62. Thereafter, the parked or stopped vehicle controller 41 may cause the process to return to step ST5. Note that, in one example, the parked or stopped vehicle controller 41 may cause the process to return to step ST4.

In step ST8, the parked or stopped vehicle controller 41 may activate the vehicle inside camera 49 and the DMS 60. The vehicle inside camera 49 may be provided in the vehicle 2. In one embodiment, the vehicle inside camera 49 may serve as a "second sensor".

In step ST9, the activated DMS 60 may determine whether an occupant left in the vehicle 2 is detected, based on an image captured by the activated vehicle inside camera 49. This may allow the DMS 60 to confirm whether an occupant is present in the parked or stopped vehicle 2, based on the detection performed by the vehicle inside camera 49. In one embodiment, the vehicle inside camera 49 may serve as the "second sensor". If the occupant left in the vehicle 2 is not detected (step ST9: N), the DMS 60 may cause the process to proceed to step ST10. If the occupant left in the vehicle 2 is detected (step ST9: Y), the DMS 60 may cause the process to proceed to step ST12.

In step ST10, the DMS 60 may determine whether the respective operations of the DMS 60 and the vehicle inside camera 49 are to be ended.

For example, the DMS 60 may determine that the respective operations of the DMS 60 and the vehicle inside camera 49 are not to be ended until the number of times of trying reaches a certain number.

In another example, the DMS 60 may determine that the respective operations of the DMS 60 and the vehicle inside camera 49 are not to be ended until remaining electric power of the vehicle 2 becomes less than or equal to a threshold.

If the respective operations of the DMS 60 and the vehicle inside camera 49 are not to be ended (step ST10: N), the DMS 60 may cause the process to return to step ST9.

If the respective operations of the DMS 60 and the vehicle inside camera 49 are to be ended (step ST10: Y), the DMS 60 may cause the process to proceed to step ST11.

In step ST11, the DMS 60 may stop the vehicle inside camera 49, and may execute a process of ending the operation of the DMS 60. This may allow the DMS 60 and the vehicle inside camera 49 to stop. When confirming that the DMS 60 has stopped, the parked or stopped vehicle controller 41 may end this control.

The DMS 60 may stop together with the vehicle inside camera 49, for example, when no occupant has been confirmed in the parked vehicle 2 for multiple times in a row, or when the remaining electric power of the vehicle 2 is less than or equal to the threshold.

In addition, the DMS 60 may end the process without executing a control leading to the rescue control and stop.

In step ST12, the DMS 60 may activate an occupant abnormality detection control. This may allow the DMS 60 to execute, when an occupant is confirmed in the parked vehicle 2, a control leading to a rescue of the occupant.

In step ST13, the DMS 60 may notify the administrator terminal 21 belonging to the administrator of the vehicle 2 via the external communicator 52 that the occupant is left. Note that in one example, the DMS 60 may notify the administrator terminal 21 that the occupant is left via the server apparatus 3.

Thereafter, the DMS 60 may end this control.

Figure 5:
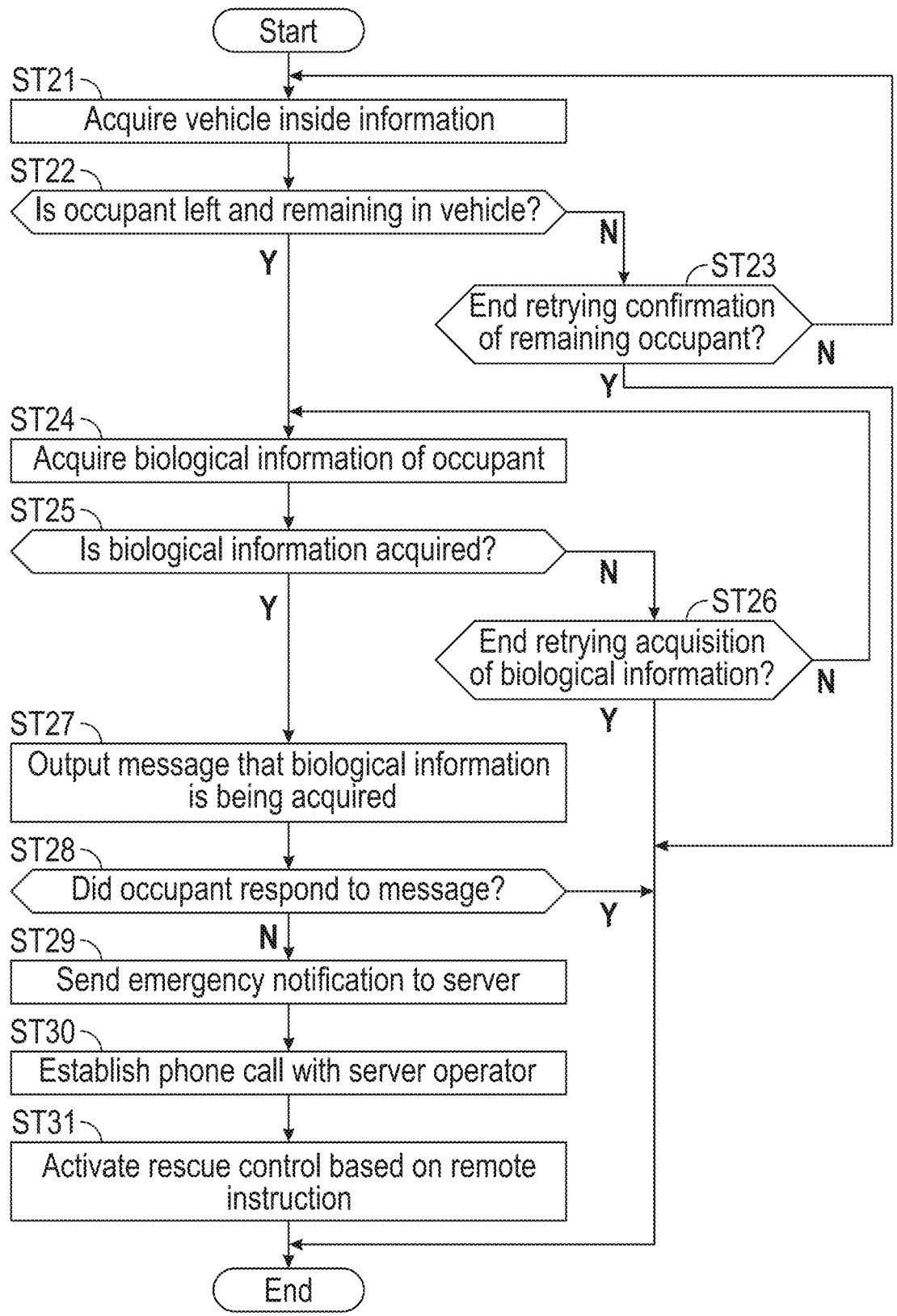
FIG. 5 is a flowchart of an occupant abnormality detection control (a second pre-process of the rescue control) to be executed by the control system of the vehicle illustrated in FIG. 3.

This may allow the DMS 60 to determine whether an occupant is present in the vehicle 2, and if the occupant is present in the vehicle 2, activate the occupant abnormality detection control illustrated in FIG. 5 to determine whether a rescue of the left occupant is to be performed.

FIG. 5 is a flowchart of the occupant abnormality detection control (a second pre-process of the rescue control) to be executed by the control system 40 of the vehicle 2 illustrated in FIG. 3.

The DMS 60 may activate and execute the occupant abnormality detection control described in FIG. 5, in step ST12 in FIG. 4.

In step ST21, the DMS 60 may acquire vehicle inside information. Non-limiting examples of the vehicle inside information may include the image captured by the vehicle inside camera 49.

In step ST22, the DMS 60 may determine whether an occupant is left and remains in the parked vehicle 2, based on the vehicle inside information acquired in step ST21. If no occupant is left and remains (step ST22: N), the DMS 60 may cause the process to proceed to step ST23. If an occupant is left and remains (step ST22: Y), the DMS 60 may cause the process to proceed to step ST24.

In step ST23, the DMS 60 may determine whether to end retrying to confirm the remaining occupant by the processes in step ST21 to step ST22. For example, the DMS 60 may determine whether to end retrying based on a comparison between the number of times of retrying and a threshold. If the retrying is not to be ended (step ST23: N), the DMS 60 may cause the process to return to step ST21. In this case, the DMS 60 may repeat the confirmation of the remaining occupant in the occupant abnormality detection control. If the retrying is to be ended (step ST23: Y), the DMS 60 may end this control. Note that in this case, in one example, the DMS 60 may stop the DMS 60 together with the vehicle inside camera 49 by a process similar to the process in step ST11 in FIG. 4, and end this control.

In step ST24, the DMS 60 may acquire biological information related to the occupant left and remains in the vehicle 2, based on the acquired vehicle inside information.

A captured image may include an infrared-ray image component or an ultraviolet-ray image component other than a visible-light image component of the occupant. In this case, the DMS 60 may be able to obtain information such as pulse information or body temperature information, based on the infrared-ray image component or the ultraviolet-ray image component included in the captured image. Non-limiting examples of the pulse information may include a pulse rate.

The captured image may also include an eye image component of the occupant. In this case, the DMS 60 may obtain information regarding whether the occupant is asleep, based on the eye image component included in the captured image.

The captured image may also include a chest image component of the occupant. In this case, the DMS 60 may obtain respiratory rate information based on a movement of the chest image component included in the captured image.

In step ST25, the DMS 60 may determine whether the biological information related to the occupant has been acquired in step ST24. If the biological information related to the occupant has not been acquired (step ST25: N), the DMS 60 may cause the process to proceed to step ST26. If the biological information related to the occupant has been acquired (step ST25: Y), the DMS 60 may cause the process to proceed to step ST27.

In step ST26, the DMS 60 may determine whether to end retrying to acquire the biological information regarding the occupant by the processes in step ST24 to step ST25. For example, the DMS 60 may determine whether to end the retrying based on a comparison between the number of times of retrying and a threshold. If the retrying is not to be ended (step ST26: N), the DMS 60 may cause the process to return to step ST24. In this case, the DMS 60 may repeat the acquisition of the biological information related to the occupant. If the retrying is to be ended (step ST26: Y), the DMS 60 may end this control. Note that in this case, for example, the DMS 60 may stop the DMS 60 together with the vehicle inside camera 49 by a process similar to the process in step ST11 in FIG. 4, and end this control.

In step ST27, the DMS 60 may output, toward the occupant present in the vehicle 2, that the biological information is being acquired. In one example, the DMS 60 may output a message indicating that the biological information is being acquired, for example, from the monitor or the speaker of the HMI apparatus 54. In one embodiment, the HMI apparatus 54 may serve as an "inside output device".

In step ST28, the DMS 60 may determine whether a response is made by the occupant to the message indicating that the biological information is being acquired. In one example, the DMS 60 may output a response button for the occupant to the monitor of the HMI apparatus 54 in step ST27. In this case, the occupant may respond by operating a touch panel of the HMI apparatus 54. In another example, the occupant may respond by a predetermined confirmation sound. If no response is made by the occupant via the HMI apparatus 54 (step ST28: N), or if a rescue request response is made from the occupant via the HMI apparatus 54, the DMS 60 may cause the process to proceed to step ST29. In other cases, for example, if a simple confirmation response is made by the occupant via the HMI apparatus 54 (step ST28: Y), the DMS 60 may end this control. Note that in this case, for example, the DMS 60 may stop the DMS 60 together with the vehicle inside camera 49 by a process similar to the process in step ST11 in FIG. 4, and end this control.

In step ST29, the DMS 60 may send an emergency notification from the external communicator 52 to the server apparatus 3. In one example, the emergency notification may include information including, without limitation, a position of the vehicle 2, the elapsed period of time from a start of parking, and the biological information of the remaining occupant. The emergency notification may be sent from the external communicator 52 to the server apparatus 3 via the base station 4 and the communication network 5.

In step ST30, the DMS 60 may establish a phone call between the DMS 60 and the server apparatus 3 and may talk with the operator 14 of the server apparatus 3 over the phone.

In step ST31, the DMS 60 may activate the rescue control in accordance with a remote activation instruction given from the server apparatus 3 by the operator 14 who has determined that a rescue is to be performed.

As described above, if no operation is made on the vehicle 2 by the occupant or no response is made by the occupant to the output to the HMI apparatus 54, the DMS 60 may determine that the occupant present in the vehicle 2 is left in the vehicle 2 and is to be rescued, and may send the emergency notification from the external communicator 52 provided in the vehicle 2 to the server apparatus 3. In one embodiment, the HMI apparatus 54 may serve as the "inside output device". The DMS 60 may send the emergency notification from the external communicator 52 provided in the vehicle 2 to the server apparatus 3 not when the vehicle 2 is simply present in the vehicle 2 but when the occupant present in the vehicle 2 is left in the vehicle 2 and is to be rescued. This makes it possible to prevent the emergency notification from being excessively sent to the server apparatus 3.

In addition, thereafter, the DMS 60 may be able to start the rescue control by the remote activation by the operator 14 who has confirmed the state of the occupant.

Figure 7:
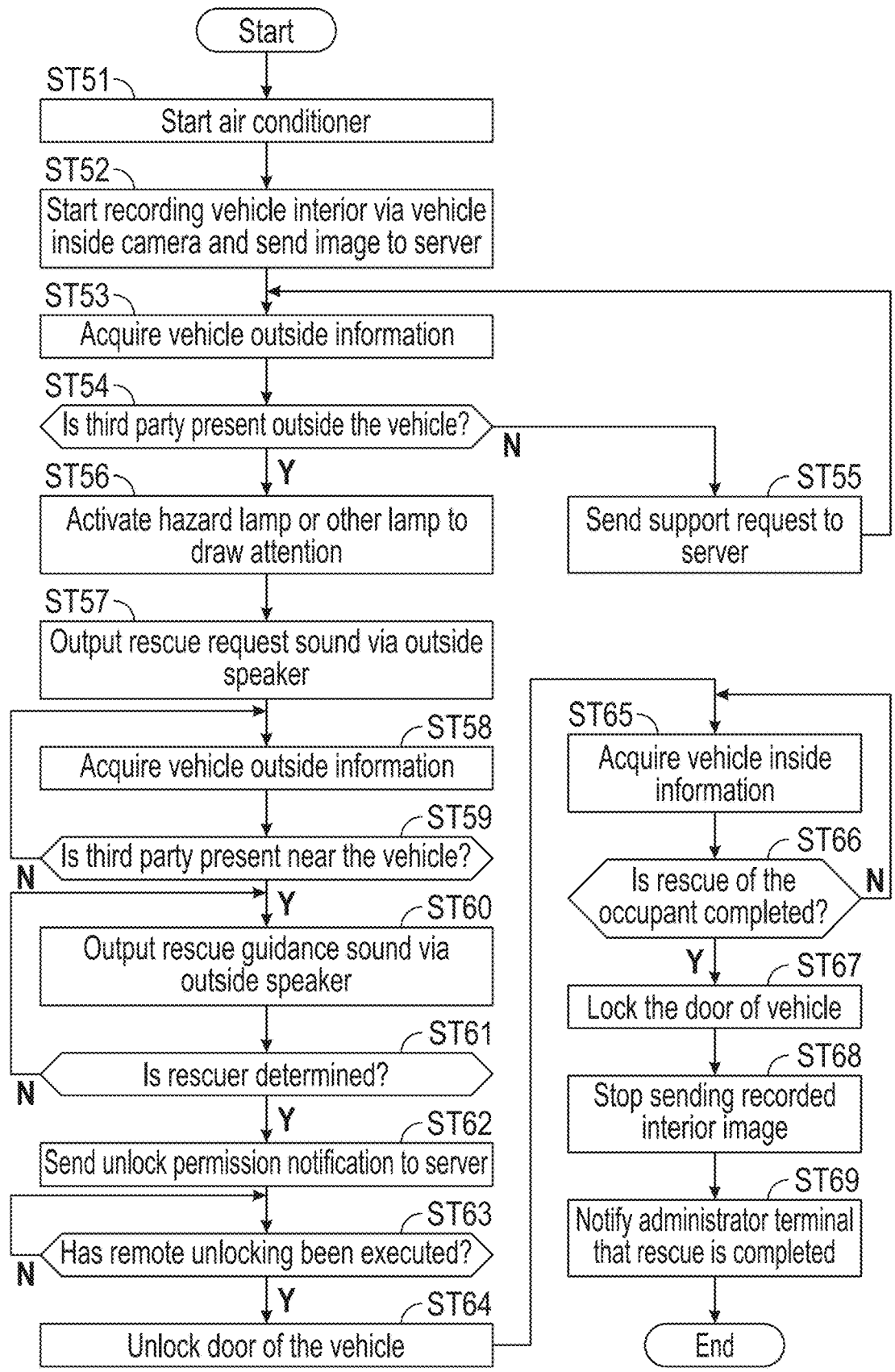
FIG. 7 is a flowchart of the rescue control to be executed by the control system of the vehicle illustrated in FIG. 3.

The DMS 60 may determine whether a rescue regarding leaving is to be performed for the occupant present in the vehicle 2, and if the rescue regarding leaving is to be performed, activate the rescue control illustrated in FIG. 7.

Figure 6:
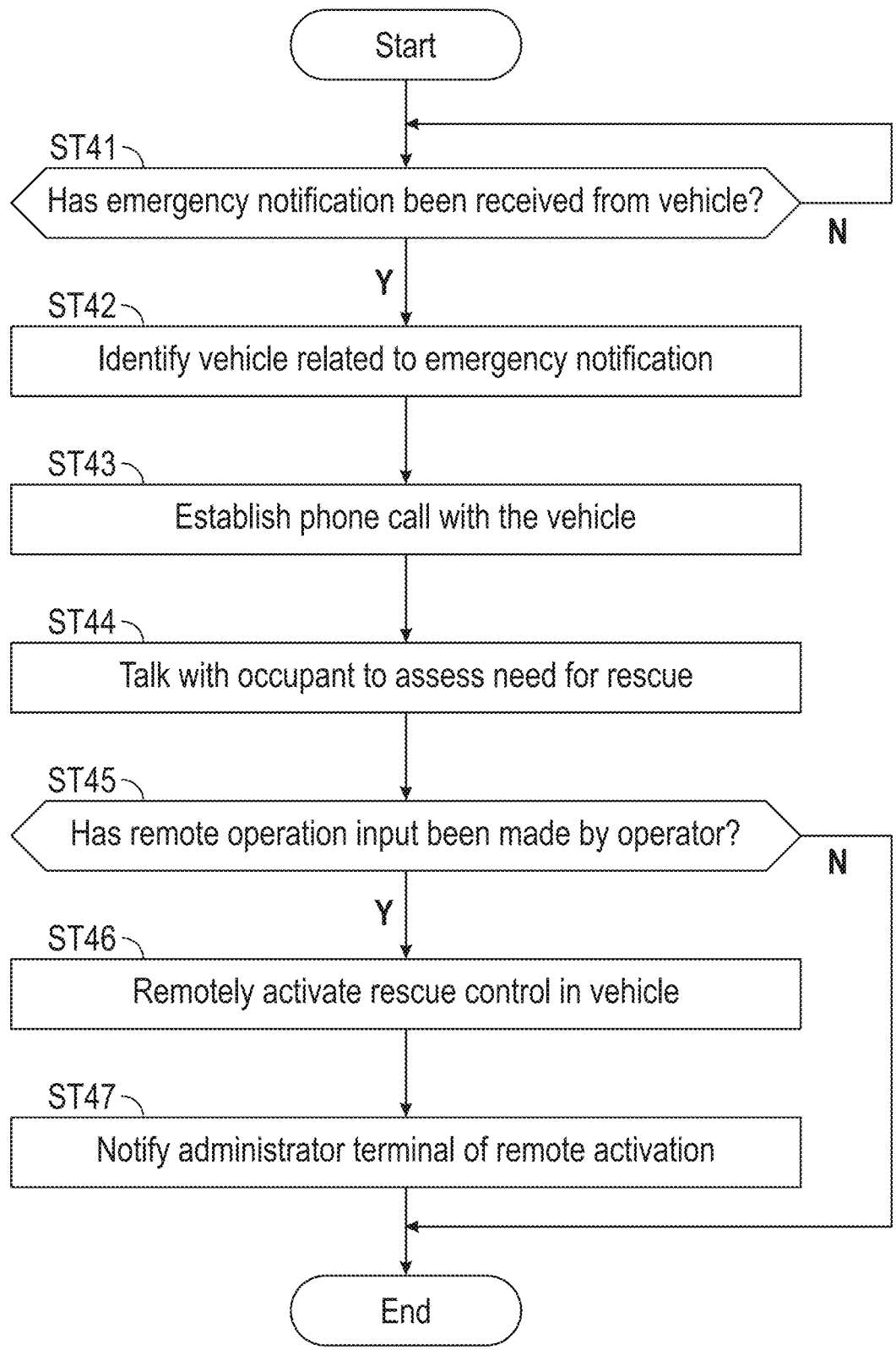
FIG. 6 is a flowchart of an emergency notification response control to be performed by the server apparatus illustrated in FIG. 1.

FIG. 6 is a flowchart of an emergency notification response control to be performed by the server apparatus 3 illustrated in FIG. 1.

The server apparatus 3 may repeatedly execute, by the server CPU 34, the emergency notification response control illustrated in FIG. 6.

In step ST41, the server apparatus 3 may determine whether the server communication device 31 has received the emergency notification from the vehicle 2. If the emergency notification has not been received (step ST41: N), the server apparatus 3 may repeat this process. If the emergency notification is received (step ST41: Y), the server apparatus 3 may cause the process to proceed to step ST42.

In step ST42, the server apparatus 3 may identify the vehicle 2 related to the emergency notification.

In step ST43, the server apparatus 3 may establish a phone call between the server apparatus 3 and the vehicle 2 that has sent the emergency notification.

In step ST44, the server apparatus 3 may allow the operator 14 of the server apparatus 3 and the occupant present in the vehicle 2 to talk over the phone. This may allow the operator 14 of the server apparatus 3 to confirm whether a situation surrounding the occupant present in the vehicle 2 is a situation in which a rescue is to be performed, and to perform a determination to decide execution of a rescue of the left occupant.

In step ST45, the server apparatus 3 may determine whether an input of a remote operation has been made by the operator 14. If the input of the remote operation has been made by the operator 14 (step ST45: Y), the server apparatus 3 may cause the process to proceed to step ST46.

If the input of the remote operation has not been made by the operator 14 (step ST45: N), the server apparatus 3 may end this control.

In step ST46, the server apparatus 3 may remotely activate the rescue control in the vehicle 2 that has sent the emergency notification.

Such remote assistance by the server apparatus 3 may allow the DMS 60 of the vehicle 2 to activate the rescue control in step ST31 in FIG. 5.

In step ST47, the server apparatus 3 may notify the administrator terminal 21 of the vehicle 2 having sent the emergency notification, that the rescue control has been remotely activated.

Thereafter, the server apparatus 3 may end this control.

Note that in one example, when receiving the emergency notification from the vehicle 2, the server apparatus 3 may thereafter store and record, in the server memory 35, various kinds of data generated in the vehicle 2, various kinds of data related to the process performed by the server apparatus 3, and any other data, as log data related to leaving of an occupant. This makes it possible to examine the rescue afterward.

FIG. 7 is a flowchart of the rescue control to be executed by the control system 40 of the vehicle 2 illustrated in FIG. 3.

In step ST31 in FIG. 5, the DMS 60 may activate and execute the rescue control illustrated in FIG. 7.

In step ST51, the DMS 60 may start the air conditioner 53. This may keep a temperature in the vehicle compartment in which the occupant left in the vehicle 2 is present at a comfortable temperature. This makes it possible to suppress, for example, an excessive change in temperature.

In step ST52, the DMS 60 may start recording an image of an inside of the vehicle 2 by the vehicle inside camera 49. In addition, the DMS 60 may cause the external communicator 52 to send the image recorded by the vehicle inside camera 49 to the server apparatus 3.

In step ST53, the DMS 60 may acquire vehicle outside information obtained by a device such as the vehicle outside camera 50. An image captured by the vehicle outside camera 50 may include not only an image of the region around the vehicle 2 that is an own vehicle but also an image of a place a little away from the region around the vehicle 2. If a person such as a third party is present in the place a little away from the region around the vehicle 2, the image captured by the vehicle outside camera 50 may include an image of a person such as a third party present in the place a little away from the vehicle 2.

In step ST54, the DMS 60 may determine whether a third party is present outside the vehicle 2, based on the vehicle outside information acquired in step ST53.

For example, if the image captured by the vehicle outside camera 50 includes an image of a person such as the third party present in the place a little away from the region around the vehicle 2 (step ST54: Y), the DMS 60 may determine that the third party is present outside the vehicle 2.

In this case, the DMS 60 may cause the process to proceed to step ST56.

If the DMS 60 determines that no third party is present outside the vehicle 2 (step ST54: N), the DMS 60 may cause the process to proceed to step ST55.

In step ST55, the DMS 60 may send a support request from the external communicator 52 to the server apparatus 3. Thereafter, the DMS 60 may cause the process to return to step ST53.

The DMS 60 may repeat the processes from step ST53 to step ST55 until the DMS 60 determines that a third party is present outside the vehicle 2 in step ST54, and wait for a person such as a third party who is able to rescue the occupant to appear.

In step ST56, the DMS 60 may start to draw attention of a person such as the third party present in the place a little away from the region around the vehicle 2. The DMS 60 may first turn on a lamp such as the hazard lamp 46 of the vehicle 2. In one example, the DMS 60 may turn on a lamp of the vehicle 2 other than the hazard lamp 46. In addition, the DMS 60 may basically keep the lamp such as the hazard lamp 46 in the ON state, for example, until the DMS 60 determines that the rescue is completed in step ST66 which will be described later.

In step ST57, the DMS 60 may acquire the rescue request audio data 72 from the memory 64, and may output a rescue request sound from a device such as the outside speaker 51. This may cause a person such as the third party present in the place a little away from the region around the vehicle 2 to be aware of the vehicle 2 that is the own vehicle. In addition, the person such as the third party may move toward the vehicle 2 from the place a little away from the region around the vehicle 2.

In step ST58, the DMS 60 may acquire the vehicle outside information obtained by a device such as the vehicle outside camera 50.

In step ST59, the DMS 60 may determine whether the third party is present in the region around the vehicle 2, based on the vehicle outside information acquired in step ST58.

If the third party is not present in the region around the vehicle 2 (step ST59: N), the DMS 60 may cause the process to return to step ST58. The DMS 60 may repeat the processes from step ST58 to step ST59 until the third party appears in the region around the vehicle 2.

If the third party comes to the region around the vehicle 2 or is present in the region around the vehicle 2 (step ST59: Y), the DMS 60 may cause the process to proceed to step ST60.

In step ST60, the DMS 60 may acquire the rescue guidance audio data 71 from the memory 64, and may output a rescue guidance sound from the outside speaker 51. Switching of the sound to be outputted from the outside speaker 51 from the rescue request sound to the rescue guidance sound in response to approaching of the person such as the third party to the vehicle 2 may make it easier for the person such as the third party in the region around the vehicle 2 to pay attention to the rescue guidance sound. This may make it possible to cause the person such as the third party in the region around the vehicle 2 to recognize and understand that the occupant left in the vehicle 2 is to be rescued.

Note that if the DMS 60 does not determine that the third party is detected, the DMS 60 may continue to output the rescue request sound from the outside speaker 51.

In step ST61, the DMS 60 may determine whether a rescuer is decided. For example, when a person is present who is further approaching the vehicle 2 to rescue the occupant based on the vehicle outside information, the DMS 60 may determine that the rescuer is decided. If the rescuer is not decided (step ST61: N), the DMS 60 may cause the process to return to step ST60. The DMS 60 may wait until the rescuer is decided while outputting the rescue guidance sound. If the rescuer is decided (step ST61: Y), the DMS 60 may cause the process to proceed to step ST62.

In step ST62, the DMS 60 may send an unlock permission notification from the external communicator 52 to the server apparatus 3.

In step ST63, the DMS 60 may determine whether remote unlocking has been executed. If the DMS 60 has not received, from the server apparatus 3, a notification indicating that the remote unlocking has been executed (step ST63: N), the DMS 60 may repeat this process. If the DMS 60 receives, from the server apparatus 3, the notification indicating that the remote unlocking has been executed (step ST63: Y), the DMS 60 may cause the process to proceed to step ST64.

In step ST64, the DMS 60 may unlock the door of the vehicle 2 by the door locking apparatus 44. This may allow the rescuer to open the door of the vehicle 2 and carry the occupant left in the vehicle 2 out of the vehicle to rescue the occupant.

In step ST65, the DMS 60 may acquire the vehicle inside information.

In step ST66, the DMS 60 may determine whether the rescue of the occupant is completed, based on the vehicle inside information acquired in step ST65. For example, if no person is included in the image of the inside of the vehicle 2 captured by the vehicle inside camera 49, the DMS 60 may determine that the rescue of the occupant is completed.

If the rescue of the occupant is not completed (step ST66: N), the DMS 60 may cause the process to return to step ST65. The DMS 60 may repeat the processes from step ST65 to step ST66 until the rescue of the occupant is completed.

If the rescue of the occupant is completed (step ST66: Y), the DMS 60 may cause the process to proceed to step ST67.

In step ST67, the DMS 60 may lock the door of the vehicle 2 by the door locking apparatus 44. After the DMS 60 locks the door of the vehicle 2, the third party may be prevented from getting in the vehicle 2.

In step ST68, the DMS 60 may stop sending the recorded image of the inside of the vehicle 2 that has started in step ST52.

In step ST69, the DMS 60 may notify, from the external communicator 52, the administrator terminal 21 belonging to the administrator of the vehicle 2 that the rescue is completed. Note that in one example, the DMS 60 may notify the administrator terminal 21 that the rescue is completed via the server apparatus 3.

Thereafter, the DMS 60 may end this control. Note that in this case, for example, the DMS 60 may stop the DMS 60 together with the vehicle inside camera 49 by a process similar to the process in step ST11 in FIG. 4, and end this control.

As described above, the DMS 60 may be configured to, when a vibration caused by an occupant or any other person in the vehicle 2 is detected by the acceleration sensor 42, and the occupant present in the vehicle 2 is left in the vehicle 2 and is to be rescued, cause air conditioning in the vehicle 2 to operate, and cause the vehicle inside camera 49 to operate. The vehicle inside camera 49 may be configured to detect an occupant in the vehicle 2. In one embodiment, the acceleration sensor 42 may serve as the "first sensor". In one embodiment, the vehicle inside camera 49 may serve as the "second sensor". The vehicle inside camera 49 may confirm whether an occupant is present in the vehicle 2 or a state of an occupant present in the vehicle 2. If the occupant present in the vehicle 2 is determined as being left in the vehicle 2 and being to be rescued, the DMS 60 may cause the rescue request sound to be outputted from the outside speaker 51 toward a third party outside the vehicle 2. In one embodiment, the outside speaker 51 may serve as the "outside output device".

When the third party present in the region around the vehicle 2 or the third party arriving at the region around the vehicle 2 is detected by the vehicle outside camera 50 after outputting of the rescue request sound from the outside speaker 51 is started, the DMS 60 may cause the rescue guidance sound to be outputted from the outside speaker 51 toward the outside of the vehicle 2. In one embodiment, the vehicle outside camera 50 may serve as the "outside detection device".

After the rescue request sound is outputted and outputting of the rescue guidance sound is started, the DMS 60 may execute a process to unlock the locking apparatus to allow the third party in the region around the vehicle 2 to rescue the occupant left in the vehicle 2. The DMS 60 may thus allow the occupant left in the vehicle 2 to be rescued.

When the occupant left in the vehicle 2 is present, the DMS 60 may execute the rescue control to rescue the occupant from the vehicle 2 to the outside.

Figure 8:
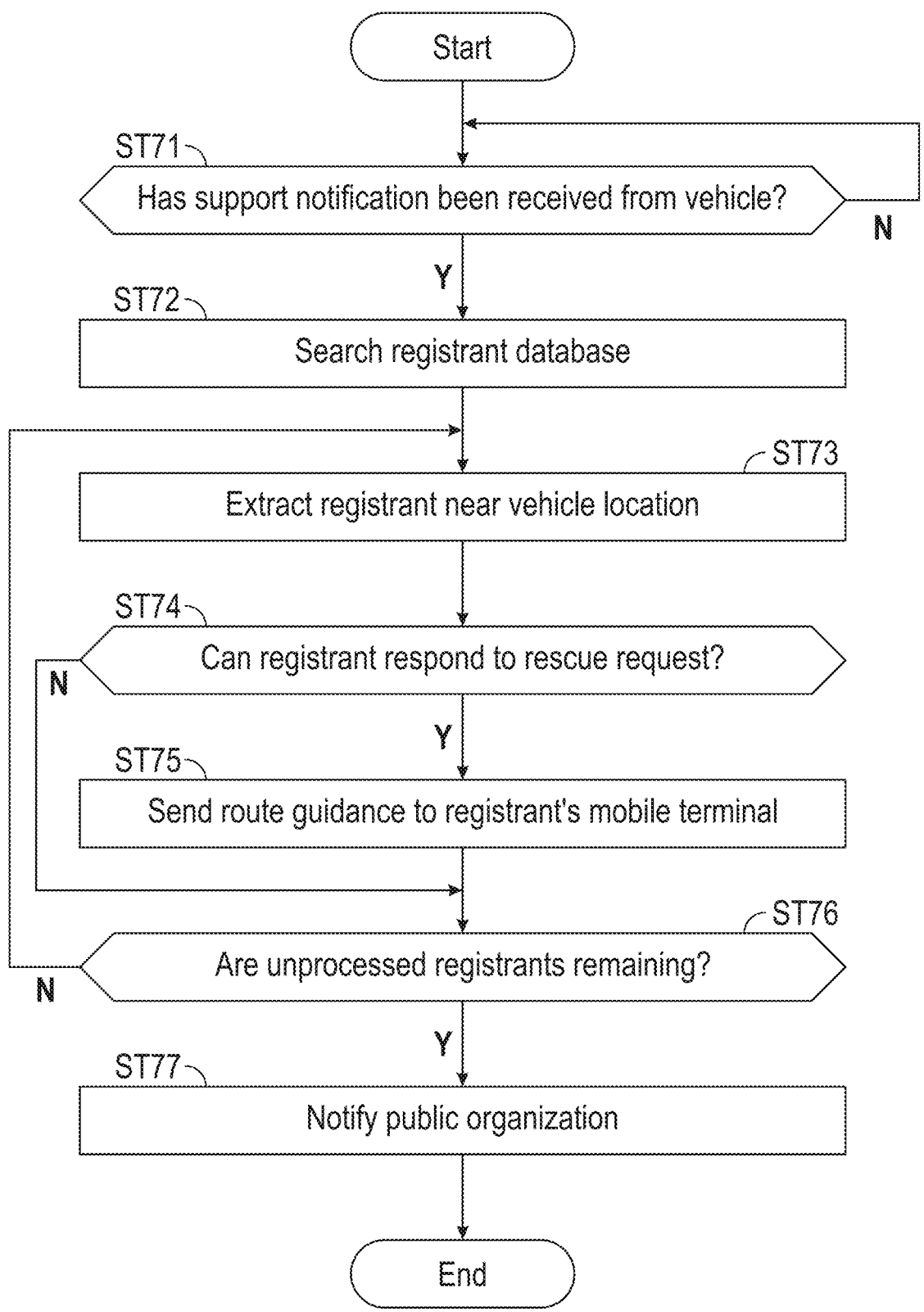
FIG. 8 is a flowchart of a support notification response control to be executed by the server apparatus illustrated in FIG. 1.

FIG. 8 is a flowchart of a support notification response control to be executed by the server apparatus 3 illustrated in FIG. 1.

The server apparatus 3 may repeatedly execute the support notification response control illustrated in FIG. 8 by the server CPU 34.

In step ST71, the server apparatus 3 may determine whether the server communication device 31 has received a support notification from the vehicle 2. If the support notification has not been received (step ST71: N), the server apparatus 3 may repeat this process. If the support notification has been received (step ST71: Y), the server apparatus 3 may cause the process to proceed to step ST72.

In step ST72, the server apparatus 3 may start searching the registrant database 37 in the server memory 35 for a registrant. The registrant database 37 may hold information such as latest positions of the registrants.

In step ST73, the server apparatus 3 may extract, from the registrant database 37, a registrant near the position of the vehicle 2 that has sent the support notification. In one example, the server apparatus 3 may extract, from the registrant database 37, registrants in order of closeness to the position of the vehicle 2 that has sent the support notification.

In step ST74, the server apparatus 3 may determine whether the extracted registrant has agreed to cope with the rescue request, or is able to cope with the rescue request. If the extracted registrant is able to cope with the rescue request (step ST74: Y), the server apparatus 3 may cause the process to proceed to step ST75. If the extracted registrant is not able to cope with the rescue request (step ST74: N), the server apparatus 3 may cause the process to proceed to step ST76.

In step ST75, the server apparatus 3 may send, to a mobile terminal of the extracted registrant, a guidance of a route leading to the position of the vehicle 2 that has sent the support notification. For example, the guidance of the route may include map data indicating the route.

Note that in one example, an application program for this service or any other service may be installed in advance on the mobile terminal of the registrant.

In step ST76, the server apparatus 3 may determine whether no registrant near the vehicle 2 remains not being subjected to processing. For example, if no registrant whose moving time is less than or equal to a threshold remains, the server apparatus 3 may determine that no registrant near the vehicle 2 remains not being subjected to the processing. The moving time may be a time that it takes for the registrant to come to the position of the vehicle 2 that has sent the support notification.

If any registrant remains not being subjected to the processing (step ST76: N), the server apparatus 3 may cause the process to return to step ST73. The server apparatus 3 may thus repeat the processes from step ST73 to step ST76 until the server apparatus 3 determines that no registrant remains not being subjected to the processing. The server apparatus 3 may be configured to send the guidance of the route leading to the position of the vehicle 2 that has sent the support notification, to multiple registrants near the vehicle 2.

If no registrant remains not being subjected to the processing (step ST76: Y), the server apparatus 3 may cause the process to proceed to step ST77.

In step ST77, the server apparatus 3 may send a notification to a public organization such as the police, a management company of a parking lot, or any other organization. This may make it possible to allow a person other than the registrant to come to the vehicle 2 that has sent the support notification. Non-limiting examples of the person other than the registrant may include a police officer.

As described above, the server apparatus 3 may be configured to guide the registrant near the vehicle 2 to the vehicle 2 based on reception of the emergency notification. The registrant near the vehicle 2 may be one among the registrants registered in advance.

The registrant coming to the vehicle 2 using the guidance of the route in FIG. 8 may allow the DMS 60 of the vehicle 2 to determine that a third party is present in the region around the vehicle 2 in step ST59, based on the vehicle outside information acquired in step ST58 in FIG. 7. Even if the third party is not present in the region around the vehicle 2 at first, it may be expected that the DMS 60 is able to determine whether the third party is present in the region around the vehicle 2 after waiting for a while.

Figure 9:
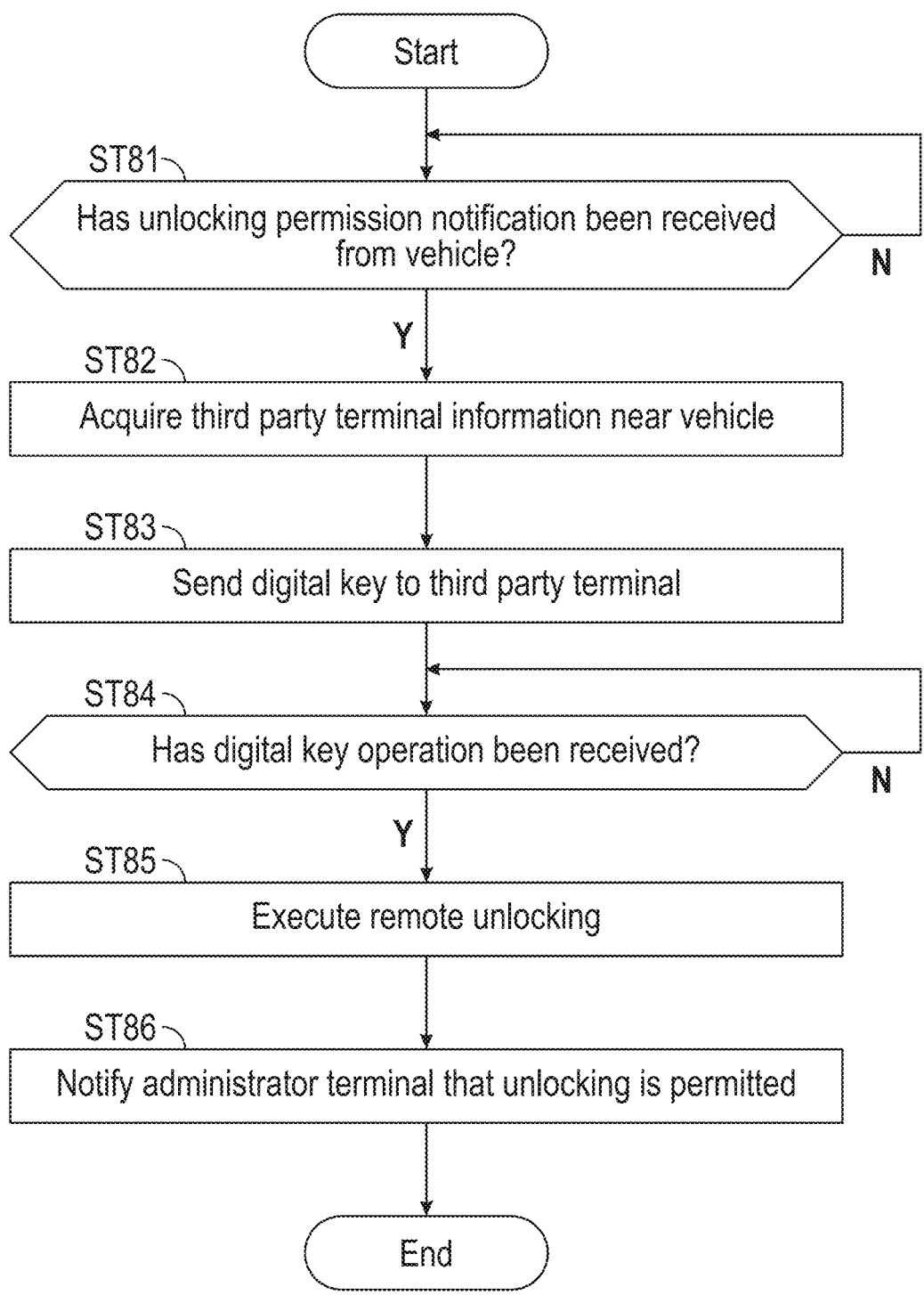
FIG. 9 is a flowchart of an unlocking permission notification response control to be executed by the server apparatus illustrated in FIG. 1.

FIG. 9 is a flowchart of an unlocking permission notification response control to be executed by the server apparatus 3 illustrated in FIG. 1.

The server apparatus 3 may repeatedly execute the unlocking permission notification response control illustrated in FIG. 9 by the server CPU 34.

In step ST81, the server apparatus 3 may determine whether the server communication device 31 has received an unlocking permission notification from the vehicle 2. If the server communication device 31 has not received the unlocking permission notification (step ST81: N), the server apparatus 3 may repeat this process. If the server communication device 31 receives the unlocking permission notification (step ST81: Y), the server apparatus 3 may cause the process to proceed to step ST82.

In step ST82, the server apparatus 3 may acquire information regarding the third party terminal 22 belonging to a third party in the region around the vehicle 2 by the server communication device 31. Here, the third party may include the registrant guided along the route leading to the vehicle 2. In one example, the server apparatus 3 may record the acquired information regarding the third party terminal 22 in the server memory 35.

In step ST83, the server apparatus 3 may send a digital key from the server communication device 31 to the third party terminal 22. The digital key may be to rescue the occupant left in the vehicle 2.

This may cause the digital key to be displayed on the third party terminal 22. The digital key may be used to agree to the rescue request. In one example, the third party terminal 22 may display buttons including, without limitation, an agree button and a reject button together with the digital key.

In this case, the third party using the third party terminal 22 may operate one of the agree button and the reject button on the third party terminal 22.

The third party terminal 22 may send, to the server apparatus 3, information indicating agreement or rejection based on the operated button.

In step ST84, the server apparatus 3 may determine whether the server communication device 31 has received an operation on the digital key.

If the server communication device 31 has not received any operation on the digital key (step ST84: N), the server apparatus 3 may repeat this process. If the server communication device 31 receives an operation on the digital key (step ST84: Y), the server apparatus 3 may cause the process to proceed to step ST85.

In step ST85, if information indicating agreement has been received as information regarding the operation on the digital key, the server apparatus 3 may execute remote unlocking. The server apparatus 3 may send a notification indicating that the remote unlocking has been executed from the server communication device 31 to the vehicle 2.

After sending the unlocking permission notification to the server apparatus 3 in step ST62 in FIG. 7, the DMS 60 of the vehicle 2 may determine whether to execute the remote unlocking in step ST63. In response to reception, from the server apparatus 3, of the notification indicating that the remote unlocking has been executed, the DMS 60 may cause the process to proceed to step ST64, and remotely unlock the door of the vehicle 2.

This may allow the third party, who has performed the operation indicating the agreement on the digital key, to open the door of the vehicle 2 and rescue the occupant left in the vehicle 2 to the outside of the vehicle 2.

In step ST86, the server apparatus 3 may send a notification indicating that the third party is permitted to unlock the door, from the server communication device 31 to the administrator terminal 21. This notification sent from the server apparatus 3 to the administrator terminal 21 belonging to the administrator of the vehicle 2 may notify that the digital key has been sent.

Thereafter, the server apparatus 3 may end this control.

As described above, in the example embodiment, when a vibration caused by an occupant in the vehicle 2 or any other person is detected by the acceleration sensor 42 in the rescue control, the DMS 60 of the vehicle 2 may sequentially execute the controls illustrated in FIGS. 4, 5, and 7 based on the detection. In one embodiment, the acceleration sensor 42 may serve as the "first sensor".

In this case, the DMS 60 may determine whether the occupant left in the vehicle 2 is to be rescued, based on the detection performed by the acceleration sensor 42. When the occupant left in the vehicle 2 is to be rescued, the DMS 60 may cause the rescue request sound to be outputted from the outside speaker 51 toward the outside of the vehicle 2. In one embodiment, the outside speaker 51 may serve as the "outside output device".

In addition, when the third party is detected by the vehicle outside camera 50 in the region around the vehicle 2 after outputting of the rescue request sound from the outside speaker 51 is started, the DMS 60 may switch the sound to be outputted from the outside speaker 51, and cause the rescue guidance sound to be outputted from the outside speaker 51 toward the outside of the vehicle 2.

Accordingly, even if a person outside the vehicle 2 is not the administrator such as the driver of the vehicle 2 but a third party, the person may be able to notice the vehicle 2 by the rescue request sound and approach the vehicle 2. In addition, when the person comes close to the region around the vehicle 2, the outputted sound may be switched in response thereto to the rescue guidance sound.

This may allow the person to quickly understand that a rescue is to be performed. Even if the person in the region around the vehicle 2 is a third party, switching of the sound between the rescue request sound and the rescue guidance sound in response to a change in a distance from the person to the vehicle 2 may allow the person to certainly recognize that an occupant is left in the vehicle 2 and is to be rescued, and to swiftly rescue the left occupant out of the vehicle 2. The change in the distance from the person to the vehicle 2 may be caused by the person approaching the vehicle 2.

When the occupant left in the vehicle 2 is to be rescued, the DMS 60 may send the emergency notification from the external communicator 52 to the server apparatus 3. The external communicator 52 may be provided in the vehicle 2. The server apparatus 3 may guide the registrant registered in advance to the vehicle 2, based on reception of the emergency notification. This makes it possible to allow the registrant who is closer to the vehicle 2 than the administrator away from the vehicle 2 or the police station to come to rescue the occupant.

As described above, in the example embodiment, it is possible to allow the third party such as a third party in the region around the vehicle 2 to cope with the leaving of the occupant in the vehicle 2, and to rescue the occupant left in the vehicle 2 at an earlier timing.

In addition, in the example embodiment, after the rescue request sound is outputted and outputting of the rescue guidance sound is started, the DMS 60 may execute a process to unlock the vehicle 2 by the locking apparatus to allow the third party in the region around the vehicle 2 to rescue the occupant left in the vehicle 2. The rescue of the occupant left in the vehicle 2 may become possible after the guidance of a rescue is made by the sound switching between the rescue request sound and the rescue guidance sound. This may prevent the third party in the region around the vehicle 2 from unlocking the vehicle 2 at an early timing, for example, when the third party does not understand that the rescue is to be performed. It is therefore expectable that an unexpected event caused by unlocking the vehicle 2 at an early timing is prevented from occurring.

Second Example Embodiment

Now, a description is provided of the vehicle leaving coping system 1 according to a second example embodiment of the disclosure. In the following, mainly described are differences between the second example embodiment and the above-described example embodiment.

Figure 10:
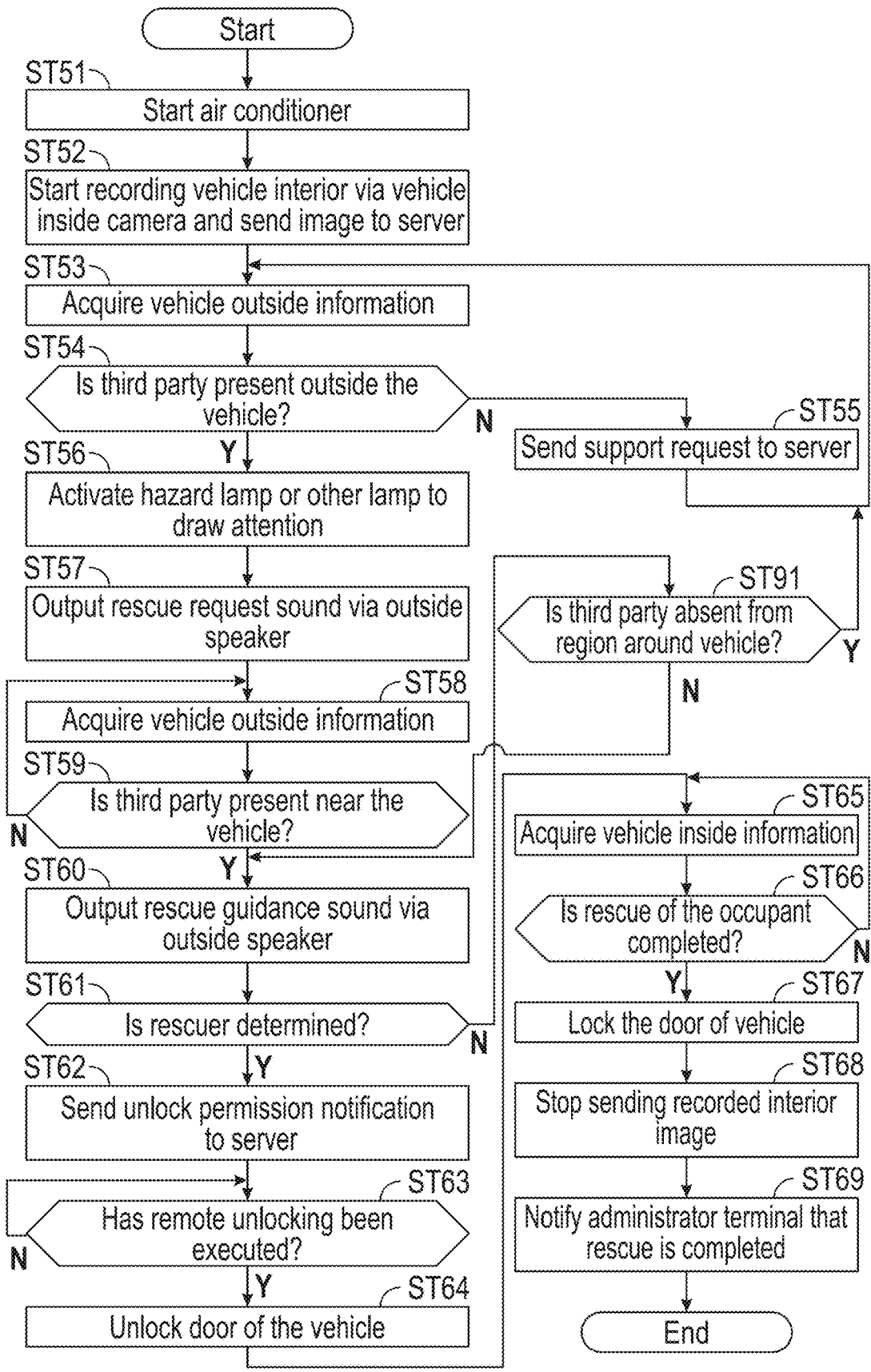
FIG. 10 is a flowchart of a rescue control according to one example embodiment of the disclosure.

FIG. 10 is a flowchart of a rescue control according to the second example embodiment of the disclosure.

If the rescuer is not decided in step ST61 (step ST61: N), the DMS 60 may cause the process to proceed to step ST91.

In step ST91, the DMS 60 may determine whether the third party is absent in the region around the vehicle 2.

If the third party who has come to the region around the vehicle 2 finds that the third party himself or herself is not able to rescue the occupant, the third party may move away from the region around the vehicle 2 to go get someone else. In this case, the third party may be absent in the region around the vehicle 2 outputting the rescue guidance sound.

The DMS 60 may determine whether such a situation is occurring in step ST91.

If the third party is not absent in the region around the vehicle 2 (step ST91: N), the DMS 60 may cause the process to return to step ST60. In this case, as with in the example embodiment described above, the DMS 60 may continue to output the rescue guidance sound to the third party in the region around the vehicle 2.

If the third party is absent in the region around the vehicle 2 (step ST91: Y), the DMS 60 may cause the process to return to step ST53. In this case, the DMS 60 may output the rescue request sound again. The rescue request sound may allow another person called by the third party moved away from the region around the vehicle 2 to easily arrive at the vehicle 2.

In addition, the DMS 60 may repeat such switching between the sounds until the rescuer is decided in step ST61.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the example embodiments described above, two kinds of sounds may be outputted toward the third party who is in the region around the vehicle 2 or any other region: the rescue request sound and the rescue guidance sound.

Other than the above case, for example, the sound outputted toward the third party who is in the region around the vehicle 2 or any other region may be switched among three or more kinds of sounds depending on a distance from the third party to the vehicle 2.

In addition, for example, the sound outputted toward the outside may be switched depending on an attribute of the person who is in the region around the vehicle 2 or any other region. For example, the sound outputted toward the outside may be switched between a sound for the registrant and a sound for a third party other than the registrant.

In the example embodiments described above, the vehicle inside camera 49 may be activated together with the DMS 60, and used in the various controls described above. In one embodiment, the DMS 60 may serve as the "main controller".

Other than the vehicle inside camera 49, the sensor activated to detect the occupant left in the vehicle 2 may be, for example but not limited to, a radar, a millimeter-wave sensor, or an infrared-ray sensor directed toward the inside of the vehicle 2. Such a sensor may be activated together with the DMS 60 and used in the various controls described above. In one embodiment, the radar, the millimeter-wave sensor, or the infrared-ray sensor described above may serve as the "second sensor".

In the example embodiments described above, the acceleration sensor 42 may detect the vibration caused by a person such as an occupant in the vehicle 2. In one embodiment, the acceleration sensor 42 may serve as the "first sensor". In the control executed based on the detection of the vibration, the DMS 60 may determine whether the occupant in the vehicle 2 is left in the vehicle 2 and is to be rescued.

Other than the above case, for example, the DMS 60 may determine whether an occupant who is left in the vehicle 2 and is to be rescued is present based on the vibration itself caused by a person such as the occupant in the vehicle 2 and is detected by the acceleration sensor 42.

In addition, in one example, in the occupant abnormality detection control illustrated in FIG. 5, if the DMS 60 determines that the occupant in the vehicle 2 is left in the vehicle 2 and is to be rescued, without the operator 14 of the server apparatus 3 making a decision, the DMS 60 may execute the process of activating the rescue control in step ST31 in FIG. 5 without the remote activation instruction.

In an embodiment of the disclosure, a main controller of a vehicle determines whether an occupant left in a vehicle is to be rescued, based on a detection performed by a first sensor. When the occupant left in the vehicle is to be rescued, the main controller causes, in a rescue control, a rescue request sound to be outputted from an outside output device toward an outside of the vehicle. When a third party is detected by an outside detection device in a region around the vehicle after outputting of the rescue request sound from the outside output device is started, the main controller may switch a sound to be outputted from the outside output device, and causes a rescue guidance sound to be outputted from the outside output device toward the outside of the vehicle. Accordingly, even if a person outside the vehicle is not an administrator such as a driver of the vehicle but a third party, the person is able to notice the vehicle by the rescue request sound and approach the vehicle. In addition, when the person comes close to the region around the vehicle, the outputted sound may be switched in response thereto to the rescue guidance sound. This allows the person to quickly understand that a rescue is to be performed. Even if the person in the region around the vehicle is a third party, switching of the sound between the rescue request sound and the rescue guidance sound allows the person to certainly recognize that an occupant is left in the vehicle and is to be rescued, and to swiftly rescue the left occupant out of the vehicle.

As described above, in the embodiment of the disclosure, it is possible to allow a third party such as the third party in the region around the vehicle to cope with the leaving of the occupant in the vehicle, and to rescue the occupant left in the vehicle at an earlier timing.

In addition, in the embodiment of the disclosure, after the rescue request sound is outputted and outputting of the rescue guidance sound is started, the main controller executes a process to unlock the vehicle by a locking apparatus to allow the third party in the region around the vehicle to rescue the occupant left in the vehicle. The rescue of the occupant left in the vehicle may become possible after the guidance of a rescue is made by the sound switching between the rescue request sound and the rescue guidance sound. This makes it possible to prevent the third party in the region around the vehicle from unlocking the vehicle at an early timing, for example, when the third party does not understand that the rescue is to be performed. It is therefore expectable that an unexpected event caused by unlocking the vehicle at an early timing is prevented from occurring.

Each of the parked or stopped vehicle controller 41 and the CPU 63 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the parked or stopped vehicle controller 41 and the CPU 63 illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the parked or stopped vehicle controller 41 and the CPU 63 illustrated in FIG. 3.

The invention claimed is:

1. A vehicle leaving coping system configured to cope with leaving of an occupant left in a vehicle that is parked or stopped, the vehicle leaving coping system comprising:
   the vehicle comprising:
      a first sensor configured to perform a detection of the occupant left in the vehicle, the vehicle being locked by a locking apparatus for the vehicle;
      a main controller comprising a main central processing unit configured to execute a rescue control to rescue the occupant left in the vehicle;
      an outside output device configured to output a sound from the vehicle toward an outside of the vehicle; and
      an output detection device configured to perform a detection of a third party in a region around the vehicle; and
   the main central processing unit is configured to:
      determine, based on the detection performed by the first sensor, whether the occupant left in the vehicle is determined to be in need of rescue;
      when the occupant is determined to be in need of rescue, initiate output of a rescue request sound from the outside output device toward the outside of the vehicle;
      when the third party is detected by the outside detection device in the region around the vehicle after initiating the output of the rescue request sound, initiate output of a rescue guidance sound from the outside output device toward the outside of the vehicle; and
      after initiating the output of the rescue request sound and the output of the rescue guidance sound, execute a process to unlock the locking apparatus to allow the third party in the region around the vehicle to rescue the occupant left in the vehicle.

2. The vehicle leaving coping system according to claim 1, comprising
   a server apparatus configured to communicate with the vehicle, wherein the main central processing unit is configured to, when the occupant left in the vehicle is to be rescued, send an emergency notification from an external communicator to the server apparatus, the external communicator being provided in the vehicle, and the server apparatus comprises a server central processing unit configured to perform a control of guiding a registrant near the vehicle to the vehicle based on reception of the emergency notification, the registrant near the vehicle being one among registrants registered in advance.

3. The vehicle leaving coping system according to claim 2, wherein the main central processing unit is configured to, in the rescue control,
- determine whether the third party approaching the vehicle or the third party in the region around the vehicle at a predetermined distance or less from the vehicle is detected, based on the detection performed by the outside detection device,
- when determining that the third party is detected, switch the sound to be outputted from the outside output device from the rescue request sound to the rescue guidance sound and start the outputting of the rescue guidance sound, and
- when not determining that the third party is detected, continue the outputting of the rescue request sound from the outside output device.

4. The vehicle leaving coping system according to claim 3, wherein the main central processing unit is configured to, in the rescue control, when the third party is no longer detected by the outside detection device in the region around the vehicle after the outputting of the rescue guidance sound from the outside output device is started, cause the rescue request sound to be outputted again from the outside output device.

5. The vehicle leaving coping system according to claim 2, wherein, the main central processing unit is configured to, as a pre-stage control of the rescue control,
- when the occupant in the vehicle that is parked or stopped is confirmed by a second sensor, acquire biological information related to the occupant left in the vehicle by the second sensor, the second sensor being configured to perform a detection of the occupant in the vehicle,
- output, from an inside output device toward the occupant, information indicating that the biological information has been acquired, the inside output device being provided in the vehicle, and
- when no operation on the vehicle or no response is made by the occupant with respect to outputting, from the inside output device, of the information indicating that the biological information has been acquired, determine that the occupant in the vehicle is left in the vehicle and is to be rescued, and send the emergency notification from the external communicator to the server apparatus and start the rescue control, the external communicator being provided in the vehicle.

6. The vehicle leaving coping system according to claim 3, wherein, the main central processing unit is configured to, as a pre-stage control of the rescue control,
- when the occupant in the vehicle that is parked or stopped is confirmed by a second sensor, acquire biological information related to the occupant left in the vehicle by the second sensor, the second sensor being configured to perform a detection of the occupant in the vehicle,
- output, from an inside output device toward the occupant, information indicating that the biological information has been acquired, the inside output device being provided in the vehicle, and
- when no operation on the vehicle or no response is made by the occupant with respect to outputting, from the inside output device, of the information indicating that the biological information has been acquired, determine that the occupant in the vehicle is left in the vehicle and is to be rescued, and send the emergency notification from the external communicator to the server apparatus and start the rescue control, the external communicator being provided in the vehicle.

7. The vehicle leaving coping system according to claim 4, wherein, the main central processing unit is configured to, as a pre-stage control of the rescue control,
- when the occupant in the vehicle that is parked or stopped is confirmed by a second sensor, acquire biological information related to the occupant left in the vehicle by the second sensor, the second sensor being configured to perform a detection of the occupant in the vehicle,
- output, from an inside output device toward the occupant, information indicating that the biological information has been acquired, the inside output device being provided in the vehicle, and
- when no operation on the vehicle or no response is made by the occupant with respect to outputting, from the inside output device, of the information indicating that the biological information has been acquired, determine that the occupant in the vehicle is left in the vehicle and is to be rescued, and send the emergency notification from the external communicator to the server apparatus and start the rescue control, the external communicator being provided in the vehicle.

8. The vehicle leaving coping system according to claim 5, wherein the vehicle comprises an auxiliary controller comprising an auxiliary central processing unit configured to operate together with the first sensor in the vehicle that is parked or stopped, the auxiliary central processing unit being lower in power consumption than the main central processing unit, wherein the auxiliary central processing unit is configured to, when detecting a vibration based on a detection performed by an acceleration sensor, activate the second sensor together with the main central processing unit, the vibration indicating a possibility that the occupant is left in the vehicle, the acceleration sensor being configured to serve as the first sensor, the second sensor being provided in the vehicle, and the main central processing unit is configured to, as the pre-stage control of the rescue control,
- confirm whether the occupant is present in the vehicle that is parked or stopped, based on the detection performed by the second sensor,
- when confirming that the occupant is present in the vehicle that is parked or stopped based on the detection performed by the second sensor, execute a control leading to the rescue control, and when not confirming that the occupant is present in the vehicle that is parked or stopped based on the detection performed by the second sensor, stop the auxiliary central processing unit and the second sensor, and end a process without executing the rescue control.

9. The vehicle leaving coping system according to claim 6, wherein
the vehicle comprises an auxiliary controller comprising an auxiliary central processing unit configured to operate together with the first sensor in the vehicle that is parked or stopped, the auxiliary central processing unit being lower in power consumption than the main central processing unit, wherein
the auxiliary central processing unit is configured to, when detecting a vibration based on a detection performed by an acceleration sensor, activate the second sensor together with the main central processing unit, the vibration indicating a possibility that the occupant is left in the vehicle, the acceleration sensor being configured to serve as the first sensor, the second sensor being provided in the vehicle, and
the main central processing unit is configured to, as the pre-stage control of the rescue control,
confirm whether the occupant is present in the vehicle that is parked or stopped, based on the detection performed by the second sensor,
when confirming that the occupant is present in the vehicle that is parked or stopped based on the detection performed by the second sensor, execute a control leading to the rescue control, and
when not confirming that the occupant is present in the vehicle that is parked or stopped based on the detection performed by the second sensor, stop the auxiliary central processing unit and the second sensor, and end a process without executing the rescue control.

10. The vehicle leaving coping system according to claim 7, wherein
the vehicle comprises an auxiliary controller comprising an auxiliary central processing unit configured to operate together with the first sensor in the vehicle that is parked or stopped, the auxiliary central processing unit being lower in power consumption than the main central processing unit, wherein
the auxiliary central processing unit is configured to, when detecting a vibration based on a detection performed by an acceleration sensor, activate the second sensor together with the main central processing unit, the vibration indicating a possibility that the occupant is left in the vehicle, the acceleration sensor being configured to serve as the first sensor, the second sensor being provided in the vehicle, and
the main central processing unit is configured to, as the pre-stage control of the rescue control,
confirm whether the occupant is present in the vehicle that is parked or stopped, based on the detection performed by the second sensor,
when confirming that the occupant is present in the vehicle that is parked or stopped based on the detection performed by the second sensor, execute a control leading to the rescue control, and
when not confirming that the occupant is present in the vehicle that is parked or stopped based on the detection performed by the second sensor, stop the auxiliary central processing unit and the second sensor, and end a process without executing the rescue control.

11. The vehicle leaving coping system according to claim 8, wherein
the main central processing unit is configured to, in a process to unlock the locking apparatus,
remotely unlock the vehicle by the locking apparatus based on an operation of the third party using a digital key, the digital key being sent to a mobile terminal of the third party in the region around the vehicle, from the server apparatus or the vehicle, the server apparatus having received the emergency notification from the vehicle,
cause the server apparatus to notify a mobile terminal of an administrator of the vehicle that the digital key has ben sent to rescue the occupant left in the vehicle,
after the occupant left in the vehicle is carried out of the vehicle, lock the vehicle by the locking apparatus, and
stop respective operations of the second sensor and the main central processing unit.

12. The vehicle leaving coping system according to claim 9, wherein
the main central processing unit is configured to, in a process to unlock the locking apparatus,
remotely unlock the vehicle by the locking apparatus based on an operation of the third party using a digital key, the digital key being sent to a mobile terminal of the third party in the region around the vehicle, from the server apparatus or the vehicle, the server apparatus having received the emergency notification from the vehicle,
cause the server apparatus to notify a mobile terminal of an administrator of the vehicle that the digital key has ben sent to rescue the occupant left in the vehicle,
after the occupant left in the vehicle is carried out of the vehicle, lock the vehicle by the locking apparatus, and
stop respective operations of the second sensor and the main central processing unit.

13. The vehicle leaving coping system according to claim 10, wherein
the main central processing unit is configured to, in a process to unlock the locking apparatus,
remotely unlock the vehicle by the locking apparatus based on an operation of the third party using a digital key, the digital key being sent to a mobile terminal of the third party in the region around the vehicle, from the server apparatus or the vehicle, the server apparatus having received the emergency notification from the vehicle,
cause the server apparatus to notify a mobile terminal of an administrator of the vehicle that the digital key has ben sent to rescue the occupant left in the vehicle,
after the occupant left in the vehicle is carried out of the vehicle, lock the vehicle by the locking apparatus, and
stop respective operations of the second sensor and the main central processing unit.

14. A vehicle leaving coping system configured to cope with leaving of an occupant left in a vehicle that is parked or stopped, the vehicle leaving coping system comprising the vehicle comprising:

a first sensor configured to perform a detection of the occupant left in the vehicle, the vehicle being locked by a locking apparatus for the vehicle;

a main controller comprising circuitry configured to execute a rescue control to rescue the occupant left in the vehicle;

an outside output device including a speaker, and configured to output a sound from the vehicle toward an outside of the vehicle; and an output detection device including a sensor, and configured to perform a detection of a third party in a region around the vehicle, and the circuitry is configured to:

determine, based on the detection performed by the first sensor, whether the occupant left in the vehicle is determined to be in need of rescue;

when the occupant is determined to be in need of rescue, initiate output of a rescue request sound from the outside output device toward the outside of the vehicle;

when the third party is detected by the outside detection device in the region around the vehicle after initiating the output of the rescue request sound, initiate output of a rescue guidance sound from the outside output device toward the outside of the vehicle; and after initiating the output of the rescue request sound and the output of the rescue guidance sound, execute a process to unlock the locking apparatus to allow the third party in the region around the vehicle to rescue the occupant left in the vehicle.

* * * * *